(12) United States Patent
Wei et al.

(10) Patent No.: US 12,155,835 B2
(45) Date of Patent: Nov. 26, 2024

(54) VIDEO PROCESSING METHOD, RELATED APPARATUS, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Xue Wei, Shenzhen (CN); Guangdong Yang, Shenzhen (CN); Wei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 168 days.

(21) Appl. No.: 17/720,669

(22) Filed: Apr. 14, 2022

(65) Prior Publication Data
US 2022/0239920 A1  Jul. 28, 2022

Related U.S. Application Data

(63) Continuation of application No. PCT/CN2021/086784, filed on Apr. 13, 2021.

(30) Foreign Application Priority Data

May 8, 2020 (CN) .......................... 202010381049.1

(51) Int. Cl.
*H04N 19/00* (2014.01)
*H04N 19/114* (2014.01)
(Continued)

(52) U.S. Cl.
CPC ......... *H04N 19/132* (2014.11); *H04N 19/114* (2014.11); *H04N 19/172* (2014.11); *H04N 19/182* (2014.11); *H04N 19/50* (2014.11)

(58) Field of Classification Search
CPC .. H04N 19/132; H04N 19/114; H04N 19/172; H04N 19/182; H04N 19/50
See application file for complete search history.

(56) References Cited

U.S. PATENT DOCUMENTS

| 8,147,339 B1* | 4/2012 | Perry ................... A63F 13/355 463/31 |
| 2020/0314382 A1 | 10/2020 | Hu et al. |
| 2020/0402481 A1* | 12/2020 | Shao ....................... G09G 5/373 |

FOREIGN PATENT DOCUMENTS

| CN | 106686472 A | 5/2017 |
| CN | 107483960 A | 12/2017 |

(Continued)

OTHER PUBLICATIONS

Li et al. "CN107483960A Translation". (Year: 2017).*
(Continued)

*Primary Examiner* — Zhihan Zhou
(74) *Attorney, Agent, or Firm* — ANOVA LAW GROUP PLLC

(57) ABSTRACT

A video processing method is provided, including obtaining an original video sequence, the original video sequence comprising P video frames obtained through rendering, P being an integer greater than or equal to 2; obtaining a target video sequence according to the original video sequence, the target video sequence comprising the P video frames and Q unrendered video frames interpolated based on at least two video frames of the P video frames, Q being an integer greater than or equal to 1; encoding the target video sequence to obtain a video encoding sequence; and transmitting the video encoding sequence to a terminal device, the terminal device decoding the video encoding sequence to obtain a video sequence that needs to be rendered.

17 Claims, 16 Drawing Sheets

(51) Int. Cl.
*H04N 19/132* (2014.01)
*H04N 19/172* (2014.01)
*H04N 19/182* (2014.01)
*H04N 19/50* (2014.01)

(56) References Cited

FOREIGN PATENT DOCUMENTS

| | | |
|---|---|---|
| CN | 108322685 A | 7/2018 |
| CN | 109743626 A | 5/2019 |
| CN | 109803175 A | 5/2019 |
| CN | 110138769 A | 8/2019 |
| CN | 110324664 A | 10/2019 |

OTHER PUBLICATIONS

Wu. "CN109803175A Translation". (Year: 2019).*
Du et al. "CN110138769A Translation". (Year: 2019).*
The State Intellectual Property Office of the People's Republic of China (SIPO) Office Action 1 for for 202010381049.1 Mar. 4, 2022 10 Pages (including translation).
The World Intellectual Property Organization (WIPO) International Search Report for PCT/CN2021/086784 Jul. 21, 2021 5 Pages (including translation).

* cited by examiner

VIDEO PROCESSING METHOD, RELATED APPARATUS, STORAGE MEDIUM, AND PROGRAM PRODUCT

RELATED APPLICATIONS

This application is a continuation application of PCT Application No. PCT/CN2021/086784, filed on Apr. 13, 2021, which claims priority to Chinese patent application No. 202010381049.1, entitled "VIDEO PROCESSING METHOD, RELATED APPARATUS, AND STORAGE MEDIUM" filed with the China National Intellectual Property Administration on May 8, 2020. The two applications are incorporated herein by reference in their entirety.

FIELD OF THE TECHNOLOGY

This application relates to the field of industry applications based on cloud technologies, and specifically to a video processing technology.

BACKGROUND OF THE DISCLOSURE

Cloud gaming is an online gaming technology based on cloud computing technologies. When the cloud gaming is running, all games are run on a server terminal, and the server terminal compresses a rendered game picture and transmit the compressed game picture to a user through a network. A terminal device used by the user does not require a high-end processor and a graphics card, but requires only a basic video decompression capability.

In one example, a service procedure based on the cloud gaming is as follows. First, the terminal device is connected to a cloud gaming server, and then implements interaction between the user and a game through a data stream and a control stream. The data stream mainly includes game picture data. That is, the cloud gaming server first encodes a game picture, and then transmits encoded game picture data to the terminal device, and the terminal device decodes the encoded game picture data to be displayed on an interface.

However, in an existing service procedure, the cloud gaming server needs to render each frame of game picture, and then perform encoding based on rendered video frame. The whole process consumes more processing resources, resulting in an excessive overhead for the processor and reducing the service processing capability of the cloud gaming server.

SUMMARY

An aspect of this application provides a video processing method, performed by a server, including obtaining an original video sequence, the original video sequence comprising P video frames obtained through rendering, P being an integer greater than or equal to 2; obtaining a target video sequence according to the original video sequence, the target video sequence comprising the P video frames and Q unrendered video frames interpolated based on at least two video frames of the P video frames, Q being an integer greater than or equal to 1; encoding the target video sequence to obtain a video encoding sequence; and transmitting the video encoding sequence to a terminal device, the terminal device decoding the video encoding sequence to obtain a video sequence that needs to be rendered.

Another aspect of this application provides a video processing method, performed by a terminal device, including receiving a video encoding sequence transmitted by a server; decoding the video encoding sequence to obtain a video sequence that needs to be rendered, the video sequence that needs to be rendered comprising X unrendered video frames, X being an integer greater than or equal to 2; obtaining a target video sequence according to the video sequence that needs to be rendered, the target video sequence comprising the X unrendered video frames and Y unrendered video frames interpolated based on at least two video frames of the X video frames, Y being an integer greater than or equal to 1; and rendering the target video sequence to obtain a target video.

Another aspect of this application provides the foregoing video processing method, including: obtaining, by a server, an original video sequence, the original video sequence comprising P video frames obtained through rendering, P being an integer greater than or equal to 2; obtaining, by the server, a first target video sequence according to the original video sequence, the first target video sequence comprising the P video frames and Q unrendered video frames interpolated based on at least two video frames of the P video frames, Q being an integer greater than or equal to 1; encoding, by the server, the first target video sequence to obtain a video encoding sequence; transmitting, by the server, the video encoding sequence to a terminal device. The method further includes decoding, by the terminal device, the video encoding sequence to obtain a video sequence that needs to be rendered, the video sequence that needs to be rendered comprising (P+Q) unrendered video frames; obtaining, by the terminal device, a second target video sequence according to the video sequence that needs to be rendered, the second target video sequence comprising the (P+Q) unrendered video frames and Y unrendered video frames interpolated based on at least two video frames of the (P+Q) video frames, Y being an integer greater than or equal to 1; and rendering, by the terminal device, the second target video sequence to obtain a target video.

Another aspect of this application provides a video processing apparatus, including a memory and a processor coupled to the memory. The processor is configured to perform: obtaining an original video sequence, the original video sequence comprising P video frames obtained through rendering, P being an integer greater than or equal to 2; obtaining a target video sequence according to the original video sequence, the target video sequence comprising the P video frames and Q unrendered video frames interpolated based on at least two video frames of the P video frames, Q being an integer greater than or equal to 1; encoding the target video sequence to obtain a video encoding sequence; and transmitting the video encoding sequence to a terminal device, the terminal device decoding the video encoding sequence to obtain a video sequence that needs to be rendered.

Another aspect of this application provides a non-transitory computer-readable storage medium, storing instructions. The instructions, when run on a computer, causing the computer to perform any of the above described video processing method.

According to the video processing method in the embodiments of this application, the server first obtains an original video sequence, the original video sequence including P video frames obtained through rendering; next obtains a target video sequence according to the original video sequence, the target video sequence further including Q unrendered video frames interpolated based on at least two video frames of the P video frames; then encodes the target video sequence to obtain a video encoding sequence; and finally transmits the video encoding sequence to a terminal device, so that the terminal device decodes the video encoding sequence to obtain a video sequence that needs to be rendered. In the foregoing manner, the server only needs to render some video frames, and then perform frame interpolation based on the rendered video frames to obtain a target video sequence, and resources consumed through frame interpolation are less than resources required for rendering. Therefore, processing resources on a server side can be saved, an overhead of the processor can be reduced, and the service processing capability of the server can be improved.

DESCRIPTION OF EMBODIMENTS

Embodiments of this application provide a video processing method, a related apparatus, and a storage medium, to save processing resources on a server side, reduce an overhead of a processor, and improve a service processing capability of the server.

The video processing method provided in this application is applicable to services provided by a remote network and services provided by cloud technologies. The service scenarios under the cloud technologies include, but not limited to, cloud gaming services or cloud video services. The cloud gaming service is used as an example. This application uses a dynamic frame interpolation technology, and under a requirement that a player experiences 60 frames of game pictures per second, a cloud gaming server only needs to run 30 frames of game pictures per second, thereby saving the overhead of the processor. The cloud video service is used as an example. This application uses a dynamic frame interpolation technology, and under a requirement that an audience experiences 24 frames of animation per second, a cloud video server only needs to run 12 frames of animation per second, thereby saving the overhead of the processor.

Figure 1:
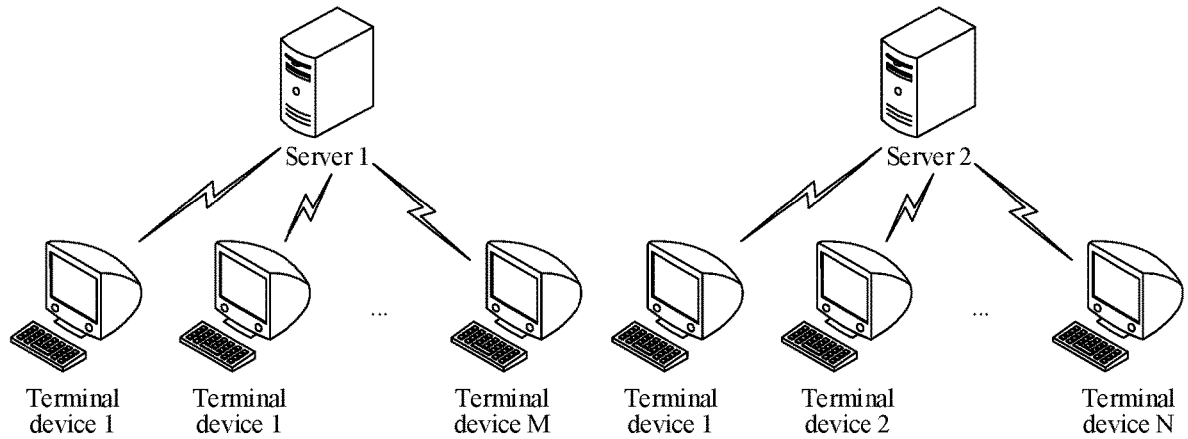
FIG. 1 is a schematic architectural diagram of a video processing system according to an embodiment of this application.

For ease of understanding, this application provides a video processing method. The method is applicable to a video processing system shown in FIG. 1. Referring to FIG. 1, FIG. 1 is a schematic architectural diagram of a video processing system according to an embodiment of this application. As shown in the figure, one server may provide services for a plurality of terminal devices. For example, a server 1 may establish communication connections to M terminal devices, and a server 2 may establish communication connections to N terminals. Values of M and N depend on processing capabilities of the servers. Generally, the values of N and M may be 100.

It may be understood that, the server shown in FIG. 1 may be an independent physical server, or may be a server cluster including a plurality of physical servers or a distributed system. This is not limited herein.

Figure 2:
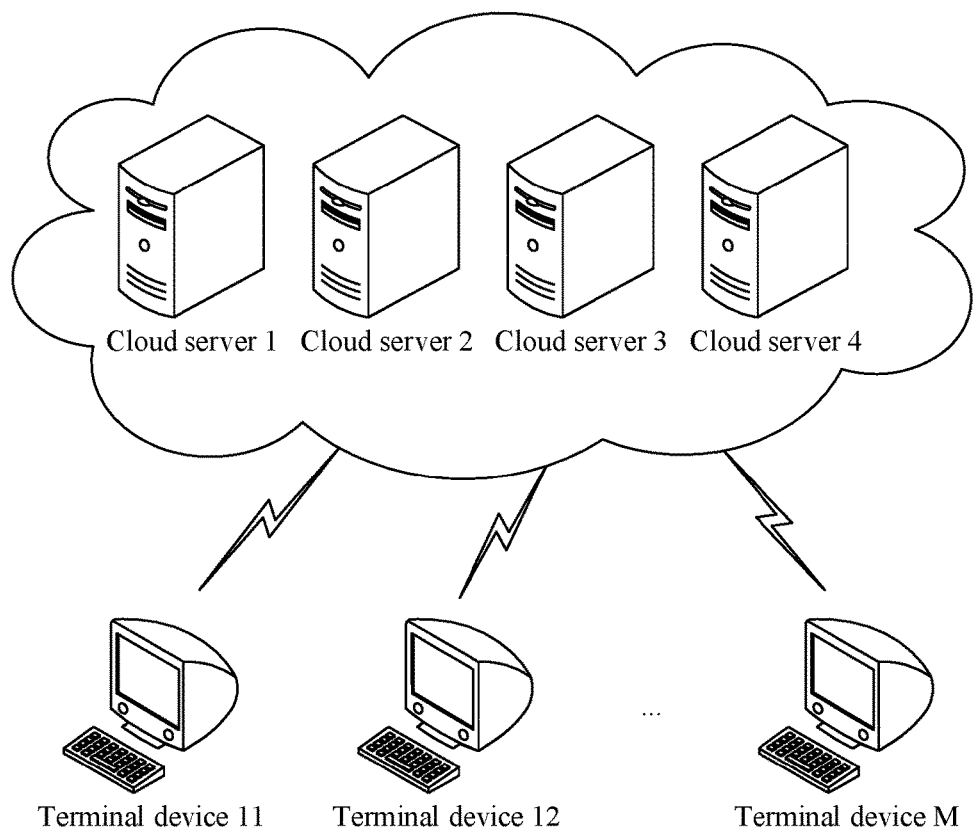
FIG. 2 is a schematic diagram of a cloud architecture of a video processing system according to an embodiment of this application.

Embodiments of this application provide a video processing method. The method is applicable to a video processing system shown in FIG. 2. FIG. 2 is a schematic diagram of a cloud architecture of a video processing system according to an embodiment of this application. As shown in the figure, a plurality of cloud servers together constitute a cloud server cluster, and one cloud server cluster may provide services for a plurality of terminal devices. For example, a cloud server cluster includes 4 cloud servers, and the cloud server cluster may establish communication connections to M terminal devices.

It may be understood that, the cloud server shown in FIG. 2 may be a cloud server for providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The terminal device shown in FIG. 1 and FIG. 2 may be a smartphone, a tablet computer, an over the top (OTT) TV, a notebook computer, a desktop computer, a smart speaker, a smartwatch, or the like, but is not limited thereto. A client such as a video client or a game client is deployed on the terminal device. The terminal device and the server may be directly or indirectly connected in a wired or wireless communication manner. This is not limited in this application.

Based on this, the cloud technology is used in the architecture shown in FIG. 2 to implement service communication. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and this can only be implemented through cloud computing.

Figure 3:
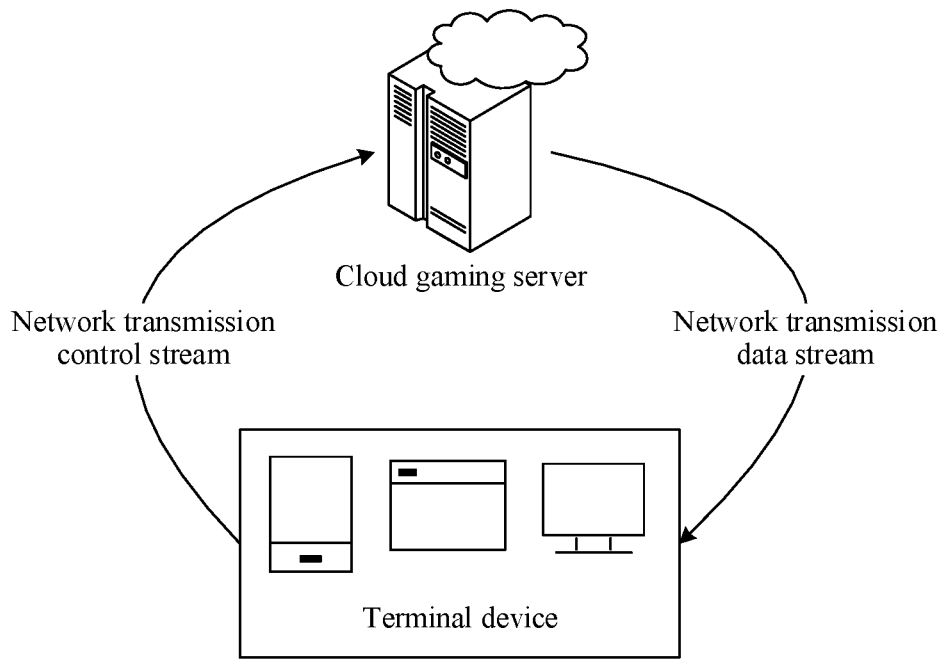
FIG. 3 is a schematic diagram of a cloud gaming architecture of a video processing system according to an embodiment of this application.

The following uses an example in which the method is applicable to a cloud gaming service scenario for description. Referring to FIG. 3, FIG. 3 is a schematic diagram of a cloud gaming architecture of a video processing system according to an embodiment of this application. As shown in the figure, when the terminal device interacts with the cloud gaming server, there are control stream transmission and data stream transmission. A control stream is mainly used for transmitting a control signal. When a user triggers an operation through an input device (such as a keyboard, a mouse or a joystick), a signal is encoded into a transmission list, and is transmitted to the cloud gaming server through a network. In addition, the cloud gaming server needs to transmit a data stream to the terminal device. The data stream includes an audio data stream and a video data stream. The terminal device then inversely decodes the data stream, and displays the decoded data stream on a screen.

Cloud gaming is also referred to as gaming on demand, and is an online gaming technology based on cloud computing technologies. The cloud gaming technology enables a thin client with relatively limited graphics processing and data computing capabilities to run a high-quality game. In a cloud gaming scene, a game is not run on a player's game terminal, but is run on a cloud server, and the cloud server renders a game scene into a video and audio stream, and transmits the video and audio stream to the player's game terminal through the network. The player's game terminal does not need to have powerful graphics operation and data processing capabilities, but only needs to have a basic streaming media playback capability and a capability of obtaining a player input instruction and transmitting the player input instruction to the cloud server. Compared with a conventional game mode, the cloud gaming can greatly reduce a device cost of playing a game by a player. For many high-quality games that require long-term updates, the cloud gaming can also reduce costs of publishing and updating and maintaining the games by game publishers.

In terms of ensuring a player's game experience, the quality of a multimedia stream rendered in a game scene depends on a network communication bandwidth. Compared with that of a conventional network game, the multimedia stream of the cloud gaming needs to consume more bandwidths, and a multimedia stream with a higher picture quality consumes more bandwidth resources. The video processing method provided in this application can not only reduce a resource overhead on a cloud server side, but also reduce a transmission amount of video frames, thereby saving the network bandwidth while ensuring the game picture quality. A massive multiplayer online (MMO) game is used as an example. Consumption of one graphics processing unit (GPU) is 36%, and by using the method provided in this application, the consumption of the GPU is 20%. In a conventional mode, one GPU can run up to 3 game processes, and by using the method provided in this application, one GPU can run 5 game processes.

Figure 4:
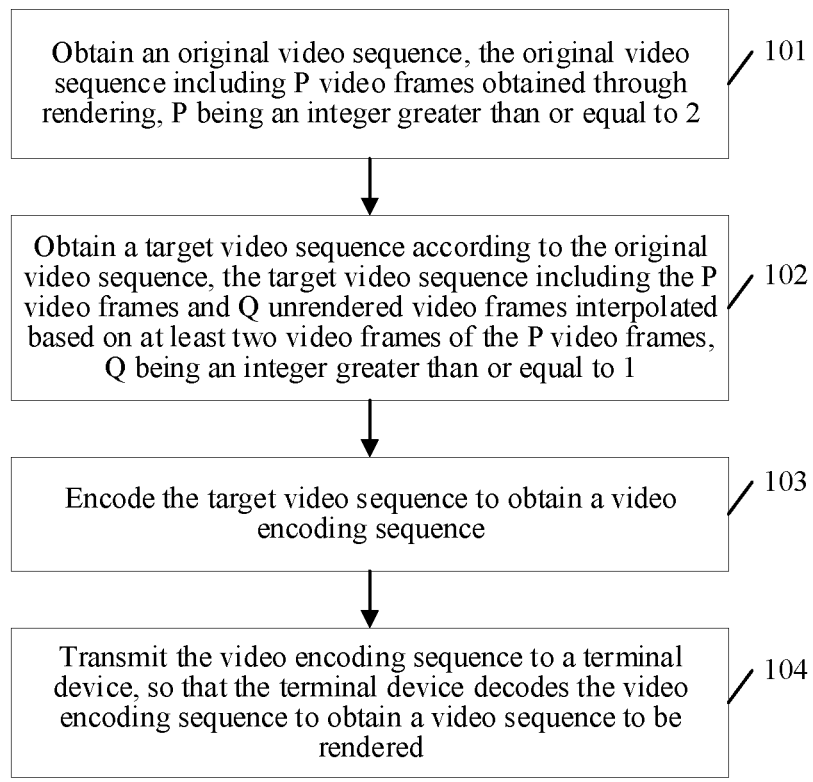
FIG. 4 is a schematic diagram of an embodiment of a video processing method according to an embodiment of this application.

With reference to the foregoing description, a video processing method in this application is described below from the perspective of a server. Referring to FIG. 4, an embodiment of the video processing method in this embodiment of this application includes the following steps:

101. A server obtains an original video sequence, the original video sequence including P video frames obtained through rendering, P being an integer greater than or equal to 2.

In this embodiment, the server obtains consecutive P frames of pictures, that is, P video frames, and the P video frames may constitute an original video sequence. A video frame may refer to a rendered video picture, or may refer to a rendered game picture, or may refer to other types of rendered pictures. The server involved in this application may be a local server (such as a game server or a video server), or may be a cloud server (such as a cloud gaming server or a cloud video server). For ease of description, this application is described by using an example in which the server is applicable to the cloud gaming server in a cloud gaming service, but this is not to be understood as a limitation on this application.

Picture rendering requires operating, through a program, information such as a geometry and vertices of a drawn graphic, to obtain an image. In this process, a processor of a computer needs to perform a large amount of operation. In an actual application, both a central processing unit (CPU) and a GPU may perform rendering tasks. Because requirements on picture resolution and quality are increasingly high, and it is difficult for single-precision floating-point performance of the CPU to meet a rendering requirement of a complex picture, the GPU may take over most of graphics rendering work, but the CPU needs to schedule the GPU for rendering through some instructions.

102. The server obtains a target video sequence according to the original video sequence, the target video sequence including the P video frames and Q unrendered video frames interpolating based on at least two video frames of the P video frames, Q being an integer greater than or equal to 1.

In this embodiment, the server performs frame interpolation on the P video frames in the original video sequence, and may perform frame interpolation on two adjacent video frames. For example, the server performs frame interpolation on a video frame No. 1 and a video frame No. 2, and then performs frame interpolation on the video frame No. 2 and a video frame No. 3, and so on. The server may alternatively perform frame interpolation on two related video frames. For example, the server performs frame interpolation on a video frame No. 1 and a video frame No. 2, and then performs frame interpolation on the video frame No. 3 and a video frame No. 4, and so on. The server may alternatively perform frame interpolation on video frames at intervals. For example, the server performs frame interpolation on a video frame No. 1 and a video frame No. 2, and then performs frame interpolation on a video frame No. 5 and a video frame No. 6. Q video frames obtained through frame interpolation are generated based on the original video sequence, and the Q video frames and the P video frames together constitute a target video sequence.

It may be understood that, resources consumed by interpolating one frame of image are less than resources consumed by rendering the one frame of image. Frame interpolation methods include, but not limited to, frame sampling, frame blending, motion compensation, and an optical flow method. The frame sampling refers to extending a display time of using each key frame, which is equivalent to interpolating several same key frames. The frame blending refers to increasing transparency of previous and subsequent key frames after one frame is interpolated, and then synthesizing a new frame. Motion compensation refers to recognizing a motion of an object and then performing compensated frame interpolation. The optical flow method refers to finding a motion trajectory of a pixel in previous and subsequent frames when a grayscale value (or a brightness value) of a same pixel is constant in the previous and subsequent frames, and then performing predictive frame-interpolation processing based on the motion trajectory.

103. The server encodes the target video sequence to obtain a video encoding sequence.

In this embodiment, the server encodes a target video sequence by using an encoding algorithm, to generate a video encoding sequence. The encoding process may be run on a CPU of the server, or may be run on a GPU, or may be run on other encoding hardware such as an encoding chip inside a GPU or a dedicated encoding chip independent of a GPU. The encoding algorithm may use H264, H265, VP8 or VP9 algorithm, which is not limited herein.

In a cloud gaming scene, because the cloud gaming is generally a low-latency service, a backward encoding reference frame or a bidirectional encoding reference frame is not used during encoding. The reason is that if the backward encoding reference frame or the bidirectional encoding reference frame (that is, a B frame) is considered, when receiving a current video frame, the terminal device further needs to wait for an arrival of a next video frame to decode the current video frame, resulting in a delay of one frame. Based on this, in this application, encoding of the server mainly uses a forward encoding reference frame (that is, a P frame) and a key frame (that is, an I frame) instead of the bidirectional encoding reference frame (that is, the B frame). The video encoding sequence includes at least one group of pictures (GOP). The GOP includes one I frame and a plurality of B frames (or P frames), and is also a basic unit for an encoder and a decoder to access. The I frame is an independent frame carrying all information, and may be independently decoded without referring to other video frames. The P frame needs to be encoded with reference to the previous I frame. The B frame records a difference between this video frame and two video frames that are respectively previous and subsequent to this video.

104. The server transmits the video encoding sequence to a terminal device, so that the terminal device decodes the video encoding sequence to obtain a video sequence that needs to be rendered.

In this embodiment, the server transmits a video encoding sequence to a terminal device. Therefore, the terminal device may decode the video encoding sequence to obtain a video sequence that needs to be rendered, finally render the video sequence that needs to be rendered to generate a target video, and present the target video on a screen of the terminal device. The decoding process may be run on a CPU of the terminal device, or may be run on a GPU, or may be run on other decoding hardware such as a decoding chip inside a GPU or a dedicated decoding chip independent of a GPU. After one video frame is obtained through decoding, the video frame may be read, rendered, and then displayed on an interface through a CPU or a GPU on a terminal device side.

In this embodiment of this application, a video processing method is provided. The server first obtains an original video sequence, the original video sequence including P video frames obtained through rendering; next obtains a target video sequence according to the original video sequence, the target video sequence further including Q video frames obtained through frame interpolation; then encodes the target video sequence to obtain a video encoding sequence; and finally transmits the video encoding sequence to a terminal device, so that the terminal device decodes the video encoding sequence to obtain a video sequence that needs to be rendered. In the foregoing manner, the server only needs to render some video frames, and then perform frame interpolation based on the rendered video frames to obtain a target video sequence, and resources consumed through frame interpolation are less than resources required for rendering. Therefore, processing resources on a server side can be saved, an overhead of the processor can be reduced, and the service processing capability of the server can be improved.

In some embodiments, based on each embodiment corresponding to FIG. 4, in another embodiment of the video processing method provided in the embodiments of this application, the obtaining, by the server, a target video sequence according to the original video sequence may include:

obtaining, by the server, a first rendered video frame and a second rendered video frame from the original video sequence, the first rendered video frame being an image of a previous frame adjacent to the second rendered video frame;

performing, by the server, frame interpolation on the first rendered video frame and the second rendered video frame to obtain a target video frame, the target video frame being an image of a next frame adjacent to the first rendered video frame, the target video frame being an image of a previous frame adjacent to the second rendered video frame, and the target video frame being an unrendered video frame; and generating, by the server, a first video subsequence in the target video sequence according to the first rendered video frame, the target video frame, and the second rendered video frame, the first video subsequence including the first rendered video frame, the target video frame, and the second rendered video frame in order.

In this embodiment, a method of obtaining a target video sequence based on frame interpolation is described. Because the original video sequence may include a large quantity of rendered video frames, for ease of description, the following uses any two adjacent rendered video frames as an example for description. In an actual application, any other two adjacent frames may be processed in a similar manner, and the details will not be described herein again.

Specifically, the server first obtains two adjacent video frames, that is, a first rendered video frame and a second rendered video frame, from the original video sequence, and then generates a new video frame based on the two rendered video frames, that is, generates a target video frame. The target video frame is a frame located between the first rendered video frame and the second rendered video frame, and is equivalent to one frame of image that is additionally interpolated. The server generates a first video subsequence in the target video sequence according to an order of the first rendered video frame, the target video frame, and the second rendered video frame. In an actual application, the server generates a series of video subsequences in a similar manner, and finally generates a target video sequence.

Figure 5:
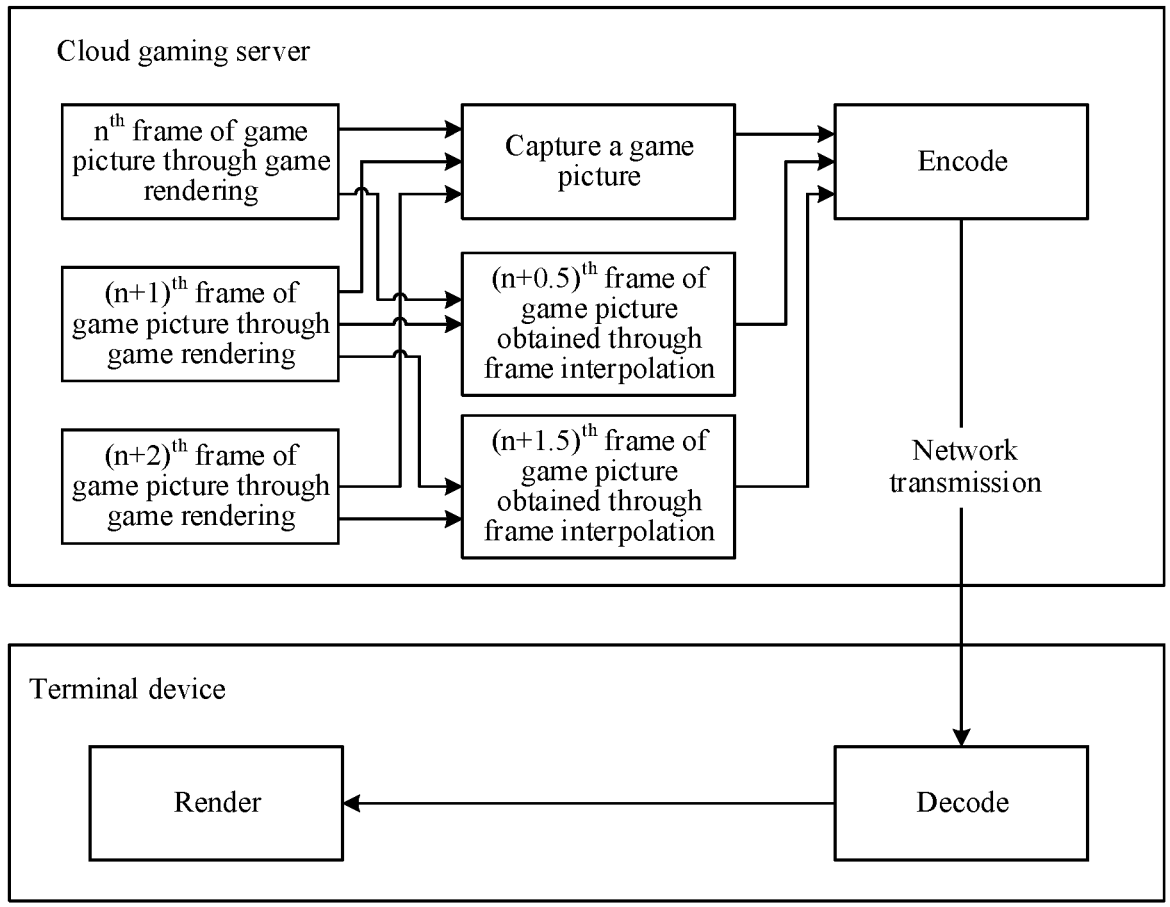
FIG. 5 is a schematic diagram of an embodiment of implementing frame interpolation based on a server according to an embodiment of this application.

For ease of understanding, referring to FIG. 5, FIG. 5 is a schematic diagram of an embodiment of implementing frame interpolation based on a server according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame interpolation on the $n^{th}$ frame of game picture and the $(n+1)^{th}$ frame of game picture, to obtain one additional frame of game picture, that is, an $(n+0.5)^{th}$ frame of game picture. Similarly, the cloud gaming server continuously captures an $(n+2)^{th}$ frame of game picture, and performs frame interpolation on the $(n+1)^{th}$ frame of game picture and the $(n+2)^{th}$ frame of game picture, to obtain one additional frame of game picture, that is, an $(n+1.5)^{th}$ frame of game picture. By analogy, the $n^{th}$ frame of game picture, the $(n+0.5)^{th}$ frame of game picture, the $(n+1)^{th}$ frame of game picture, the $(n+1.5)^{th}$ frame of game picture, the $(n+2)^{th}$ frame of game picture, and the like together constitute a target video sequence, and the target video sequence is then encoded to obtain a video encoding sequence. The cloud gaming server transmits the video encoding sequence to the terminal device through a network. Therefore, the terminal device decodes the video encoding sequence to obtain a video sequence that needs to be rendered, and the video sequence that needs to be rendered is finally displayed on an interface of the terminal device through rendering.

Figure 6:
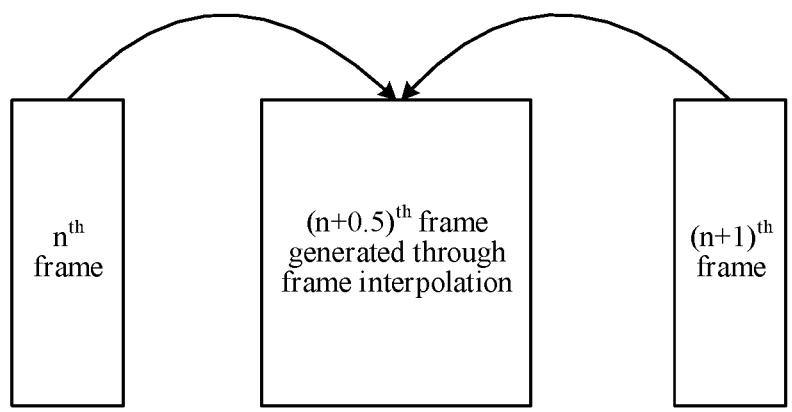
FIG. 6 is a schematic diagram of generating a target video frame in a frame interpolation mode according to an embodiment of this application.

Based on the foregoing description, referring to FIG. 6, FIG. 6 is a schematic diagram of generating a target video frame in a frame interpolation mode according to an embodiment of this application. As shown in the figure, assuming that a first rendered video frame is an $n^{th}$ frame, and a second rendered video frame is an $(n+1)^{th}$ frame, the first rendered video frame and the second rendered video frame are processed through frame interpolation to generate a target video frame, where the target video frame is an $(n+0.5)^{th}$ frame. It can be learned that assuming that the server renders 30 frames of pictures, a quantity of actual encoded pictures may be 60 frames, and a quantity of pictures outputted to the terminal device are also 60 frames. Therefore, for the terminal device, a quantity of decoded pictures is 60 frames. The frame interpolation has a good image effect, and is suitable for services that do not have a high requirement on a latency but a relatively high requirement on picture quality, for example, non-real-time battle games.

Further, in this embodiment of this application, a method of obtaining a target video sequence based on frame interpolation is provided. In the foregoing method, the target video sequence obtained through frame interpolation has a better image effect. However, because one frame delay is generated in a cloud service scenario, the method is more suitable for services that do not have a high requirement on the latency but a relatively high requirement on picture quality. Therefore, the picture quality can also be improved while saving the overhead of the processor on a server side.

In some embodiments, based on each embodiment corresponding to FIG. 4, in another embodiment of the video processing method provided in the embodiments of this application, the performing, by the server, frame interpolation on the first rendered video frame and the second rendered video frame to obtain a target video frame may include:

obtaining, by the server, a first frame number corresponding to the first rendered video frame;

obtaining, by the server, a second frame number corresponding to the second rendered video frame; and obtaining, by the server, a target frame number according to the first frame number and the second frame number.

The server may calculate an average value of the first frame number and the second frame number to obtain the target frame number. In some embodiments, the server may alternatively determine the target frame number using other methods. Further, the server obtains K pieces of pixel information corresponding to the target video frame based on the target frame number and by using a frame interpolation prediction model, the K pieces of pixel information being used for determining the target video frame, K being an integer greater than 1.

In this embodiment, a method of performing frame interpolation based on a frame interpolation prediction model is described. Because the original video sequence may include a large quantity of rendered video frames, for ease of description, the following uses any two adjacent rendered video frames as an example for description. In an actual application, any other two adjacent frames may be processed in a similar manner, and the details will not be described herein again.

Specifically, each rendered video frame corresponds to one frame number, where a frame number of the first rendered video frame is a first frame number, and a frame number of the second rendered video frame is a second frame number. Assuming that the first frame number is n and the second frame number is (n+1), a method of calculating the target frame number is as follows:

$$U = [n + (n+1)]/2,$$

U representing the target frame number, and being (n+0.5).

The target frame number is inputted into a trained frame interpolation prediction model, and K pieces of pixel information are outputted through the frame interpolation prediction model. K represents a total quantity of pixels included in one video frame. When the pixel information corresponding to K pixels is obtained, a target video frame is obtained. The pixel information may be represented in the luminance-bandwidth-chrominance (YUV) form, or may be represented in the red green blue (RGB) form.

The following uses a cloud gaming scene as an example to describe a method of training the frame interpolation prediction model. Generally, a corresponding frame interpolation prediction model may be trained for each game, or a same frame interpolation prediction model may be trained for a plurality of games. This is not limited herein. First, a to-be-trained video needs to be obtained. The to-be-trained video includes a plurality of frames of training images. During training, an $m^{th}$ frame of training image to a $r^{th}$ frame of training image may be extracted from the to-be-trained video where 0<m<r, and m may have different values in different frame interpolation prediction models. The $m^{th}$ frame of training image to the $r^{th}$ frame of training image are used as a known image frame sequence, and pixel information of each frame of training image may be then extracted from the known image frame sequence separately. The frame interpolation prediction model may be trained by using the pixel information of each frame of training image in the known image frame sequence.

In this application, the frame interpolation prediction model is represented in the following manner:

$$f_{(f,pos)} \approx \text{frame}_{(f,pos)},$$

t representing a frame number, that is, a value range of t being greater than or equal to m, and being less than or equal to r, pos representing a coordinate point (x, y) corresponding to the video frame, and $\text{frame}_{(t,pos)}$ representing pixel information of the coordinate point corresponding to pos in t video frames. The pixel information may be represented in the RGB form, the YUV form, or other forms. This is not listed herein. The frame interpolation prediction model $f_{(t,pos)}$ may be a one-time fitting function, or may be a multiple-time fitting function, or may be a functional relationship determined by using a neural network or deep learning method.

Figure 7:
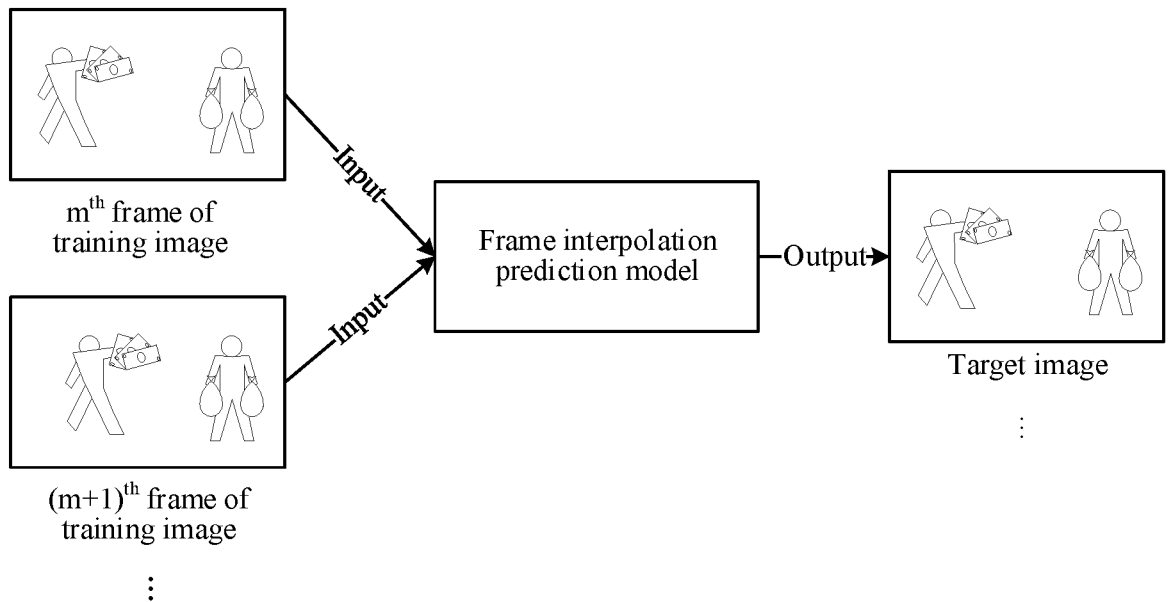
FIG. 7 is a schematic diagram of an embodiment of training a frame interpolation prediction model according to an embodiment of this application.

For ease of understanding, referring to FIG. 7, FIG. 7 is a schematic diagram of an embodiment of training a frame interpolation prediction model according to an embodiment of this application. As shown in the figure, if the frame interpolation prediction model used during frame interpolation needs to be trained, an $m^{th}$ frame of training image and an $(m+2)^{th}$ frame of training image may be inputted into a to-be-trained frame interpolation prediction model, and the frame interpolation prediction model outputs a target image, where the target image may be a predicted $(m+1)^{th}$ frame of training image. The rest may be deduced by analogy until each training image in a known image frame sequence is processed similarly.

If a frame interpolation prediction model used during frame extrapolation needs to be trained, an $m^{th}$ frame of training image and an $(m+1)^{th}$ frame of training image may be inputted into a to-be-trained frame interpolation prediction model, and the frame interpolation prediction model outputs a target image, where the target image may be a predicted $(m+2)^{th}$ frame of training image. The rest may be deduced by analogy until each training image in a known image frame sequence is processed similarly.

After a plurality of target images are predicted, the quality of the frame interpolation prediction model further needs to be evaluated. A feasible evaluation method is to use the following loss function for calculation:

$$L = \sum (f_{(t,pos)} - \text{frame}_{(f,pos)})^2,$$

L representing a loss value.

Figure 8:
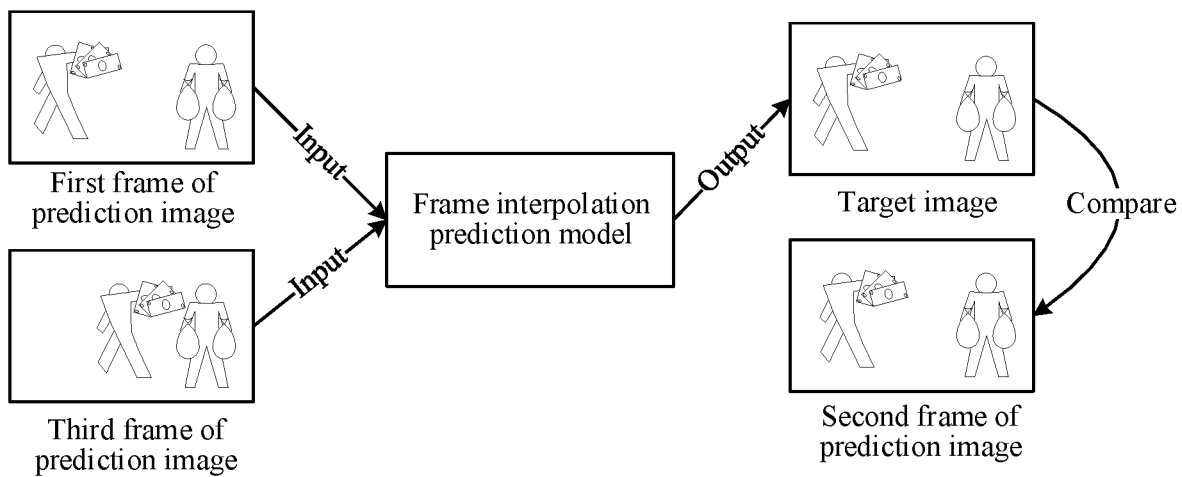
FIG. 8 is a schematic diagram of an embodiment of verifying a frame interpolation prediction model according to an embodiment of this application.

For ease of description, referring to FIG. 8, FIG. 8 is a schematic diagram of an embodiment of verifying a frame interpolation prediction model according to an embodiment of this application. As shown in the figure, a known image frame sequence with 60 frames per second (FPS) is used as an example. Prediction images corresponding to all odd-numbered frames are used as an input of the frame interpolation prediction model, and target images corresponding to even-numbered frames are outputted through the frame interpolation prediction model. The target images corresponding to the even-numbered frames are compared with the prediction images in the known image frame sequence. For example, a first frame of prediction image and a third frame of prediction image are inputted to the frame interpolation prediction model, the frame interpolation prediction model outputs a target image, and pixel information of each pixel of the target image is compared with pixel information of each pixel of a second frame of prediction image. If a difference between the two is less than a threshold, it indicates that the frame interpolation prediction model has been trained.

Further, in this embodiment of this application, a method of performing frame interpolation based on the frame interpolation prediction model is provided. In the foregoing method, each piece of pixel information in the target video frame may be predicted by using the trained frame interpolation prediction model, and these pixel information then reconstructs the target video frame, to implement the process of interpolating one frame into the video frame, thereby improving the feasibility and operability of this solution.

In some embodiments, based on each embodiment corresponding to FIG. 4, in another embodiment of the video processing method provided in the embodiments of this application, the obtaining, by the server, a target video sequence according to the original video sequence may include:

obtaining, by the server, a first rendered video frame and a second rendered video frame from the original video sequence, the first rendered video frame being an image of a previous frame adjacent to the second rendered video frame;

performing, by the server, frame interpolation on the first rendered video frame and the second rendered video frame to obtain a target video frame, the target video frame being an image of a next frame adjacent to the second rendered video frame, and the target video frame being an unrendered video frame; and generating, by the server, a second video subsequence in the target video sequence according to the first rendered video frame, the target video frame, and the second rendered video frame, the second video subsequence including the first rendered video frame, the second rendered video frame, and the target video frame in order.

In this embodiment, a method of obtaining a target video sequence based on frame extrapolation is described. Because the original video sequence may include a large quantity of rendered video frames, for ease of description, the following uses any two adjacent rendered video frames as an example for description. In an actual application, any other two adjacent frames may be processed in a similar manner, and the details will not be described herein again.

Specifically, the server first obtains two adjacent video frames, that is, a first rendered video frame and a second rendered video frame, from the original video sequence, and then generates a new video frame based on the two rendered video frames, that is, generates a target video frame. The target video frame is a frame located between the second rendered video frame and a next rendered video frame, and is equivalent to one frame of image that is additionally interpolated. The server generates a second video subsequence in the target video sequence according to an order of the first rendered video frame, the second rendered video frame, and the target video frame. In an actual application, the server generates a series of video subsequences in a similar manner, and finally generates a target video sequence.

Figure 9:
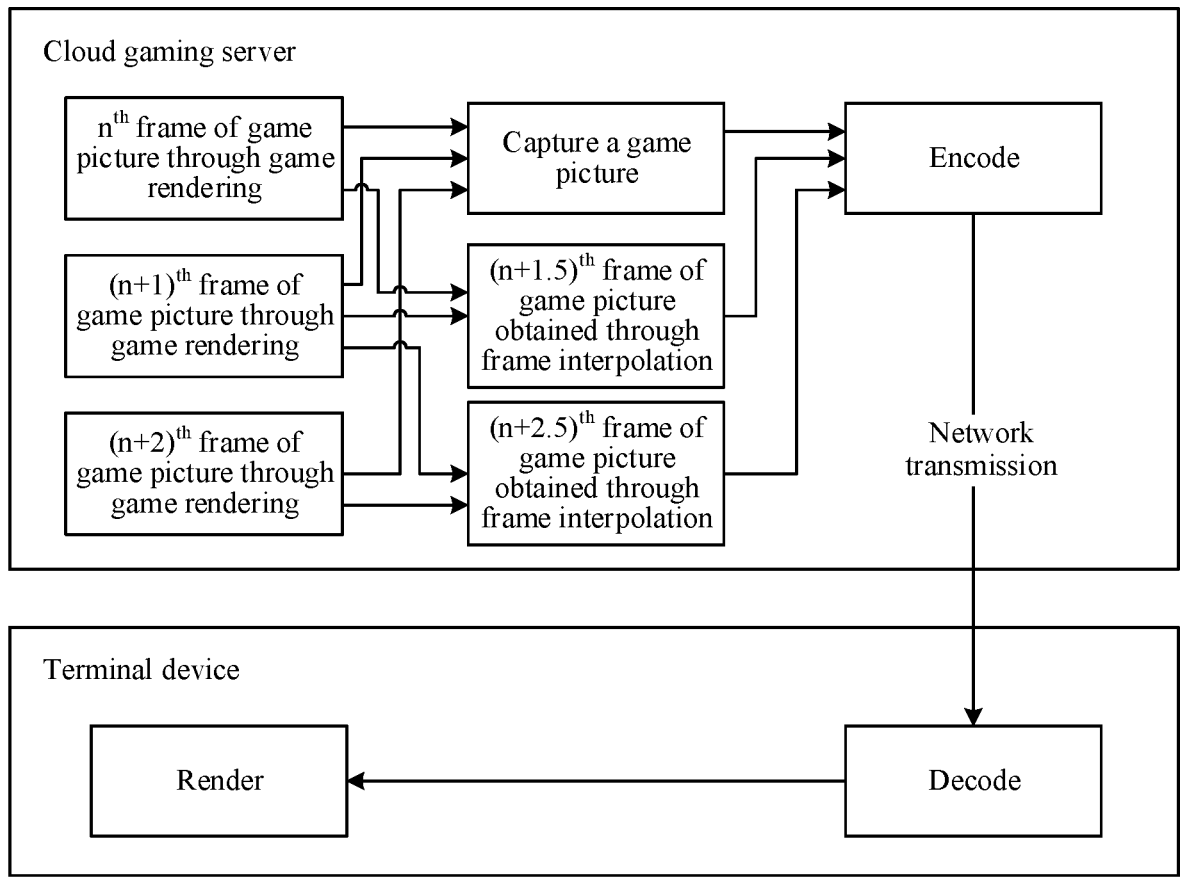
FIG. 9 is a schematic diagram of an embodiment of implementing frame extrapolation processing based on a server according to an embodiment of this application.

For ease of understanding, referring to FIG. 9, FIG. 9 is a schematic diagram of an embodiment of implementing frame extrapolation processing based on a server according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame extrapolation processing on the $n^{th}$ frame of game picture and the $(n+1)^{th}$ frame of game picture, to obtain one additional frame of game picture, that is, an $(n+1.5)$th frame of game picture. Similarly, the cloud gaming server continuously captures an $(n+2)^{th}$ frame of game picture, and performs frame extrapolation processing on the $(n+1)^{th}$ frame of game picture and the $(n+2)^{th}$ frame of game picture, to obtain one additional frame of game picture, that is, an $(n+2.5)^{th}$ frame of game picture. By analogy, the $n^{th}$ frame of game picture, the $(n+1)^{th}$ frame of game picture, the $(n+1.5)^{th}$ frame of game picture, the $(n+2)^{th}$ frame of game picture, the $(n+2.5)^{th}$ frame of game picture, and the like together constitute a target video sequence, and the target video sequence is then encoded to obtain a video encoding sequence. The cloud gaming server transmits the video encoding sequence to the terminal device through a network. The terminal device decodes the video encoding sequence to obtain a video sequence that needs to be rendered, and the video sequence that needs to be rendered is finally displayed on an interface of the terminal device through rendering.

Figure 10:
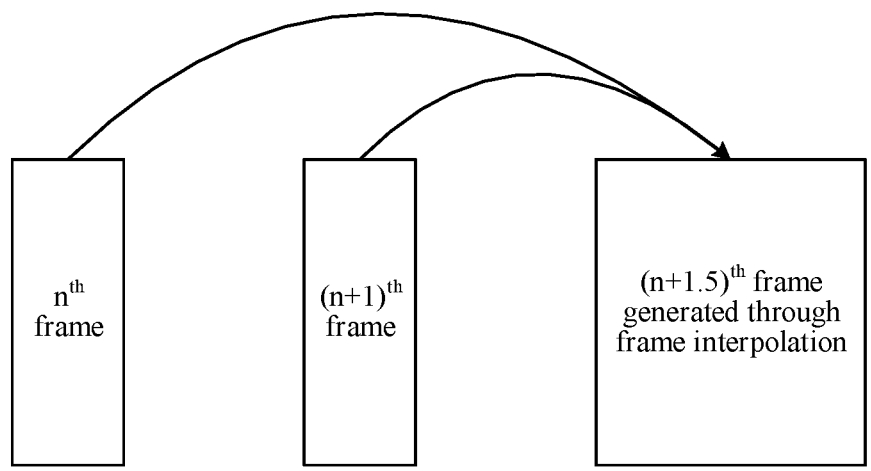
FIG. 10 is a schematic diagram of generating a target video frame in a frame extrapolation mode according to an embodiment of this application.

Based on the foregoing description, referring to FIG. 10, FIG. 10 is a schematic diagram of generating a target video frame in a frame extrapolation mode according to an embodiment of this application. As shown in the figure, assuming that a first rendered video frame is an $n^{th}$ frame, and a second rendered video frame is an $(n+1)^{th}$ frame, the first rendered video frame and the second rendered video frame are processed through frame extrapolation processing to generate a target video frame, where the target video frame is an $(n+1.5)^{th}$ frame. It can be learned that assuming that the server renders 30 frames of pictures, a quantity of actual encoded pictures may be 60 frames, and a quantity of pictures outputted to the terminal device are also 60 frames. Therefore, for the terminal device, a quantity of decoded pictures is 60 frames. The frame extrapolation does not generate an additional latency generally, and is suitable for services that has a relatively high requirement on the latency, such as real-time battle games.

Further, in this embodiment of this application, a method of obtaining a target video sequence based on frame extrapolation is provided. Because an additional latency is generally not generated in the target video sequence obtained through frame extrapolation, the method is more suitable for services that have a relatively high requirement on the latency but a low requirement on the picture quality. Therefore, a phenomenon of a picture delay caused by the latency can also be avoided while saving the overhead of the processor on a server side.

In some embodiments, based on each embodiment corresponding to FIG. 4, in another embodiment of the video processing method provided in the embodiments of this application, the performing, by the server, frame interpolation on the first rendered video frame and the second rendered video frame to obtain a target video frame may include:

obtaining, by the server, a second frame number corresponding to the second rendered video frame;

determining, by the server, a next adjacent frame number of the second frame number as a third frame number;

obtaining, by the server, a target frame number according to the second frame number and the third frame number; and obtaining, by the server, K pieces of pixel information corresponding to the target video frame based on the target frame number and by using a frame interpolation prediction model, the K pieces of pixel information being used for determining the target video frame, K being an integer greater than 1.

In this embodiment, a method of performing frame extrapolation based on a frame interpolation prediction model is described. Because the original video sequence may include a large quantity of rendered video frames, for ease of description, the following uses any two adjacent rendered video frames as an example for description. In an actual application, any other two adjacent frames may be processed in a similar manner, and the details will not be described herein again.

Specifically, each rendered video frame corresponds to one frame number, where a frame number of the first rendered video frame is a first frame number, and a frame number of the second rendered video frame is a second frame number. Assuming that the second frame number is (n+1) and the third frame number is (n+2), a method of calculating the target frame number is as follows:

$$U = [n+1+(n+2)]/2,$$

U representing the target frame number, and being (n+1.5).

The target frame number is inputted into a trained frame interpolation prediction model, and K pieces of pixel information are outputted through the frame interpolation prediction model. K represents a total quantity of pixels included in one video frame. When the pixel information corresponding to K pixels is obtained, a target video frame is obtained. The pixel information may be represented in the YUV form, or may be represented in the RGB form.

The training method of the frame interpolation prediction model has been described in the foregoing embodiments, and therefore details are not described herein again.

Further, in this embodiment of this application, a method of performing frame extrapolation based on the frame interpolation prediction model is provided. In the foregoing method, each piece of pixel information in the target video frame may be predicted by using the trained frame interpolation prediction model, and these pixel information then reconstructs the target video frame, to implement the process of extrapolating one frame into the video frame, thereby improving the feasibility and operability of this solution.

Figure 11:
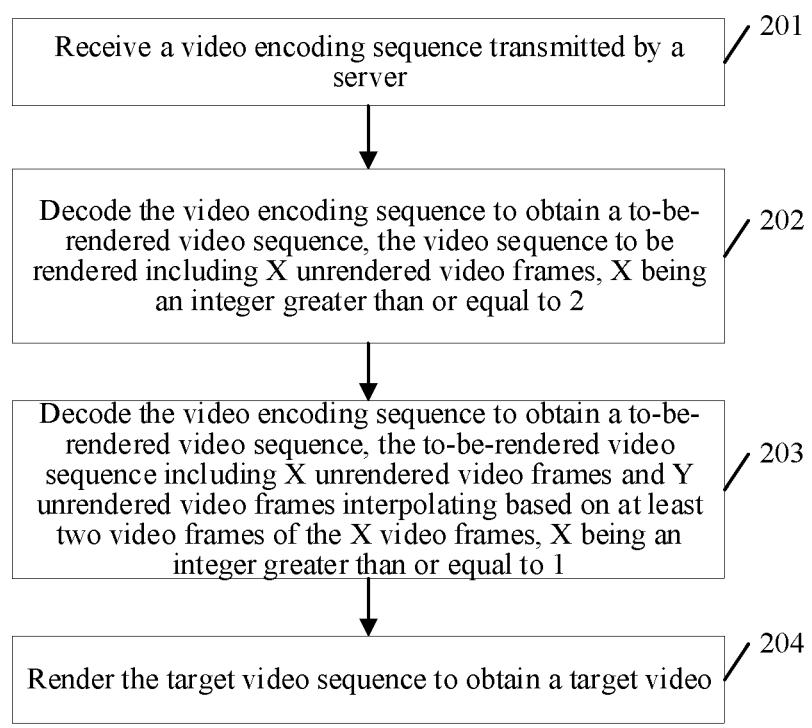
FIG. 11 is a schematic diagram of another embodiment of a video processing method according to an embodiment of this application.

With reference to the foregoing description, a video processing method in this application is described below from the perspective of a terminal device. Referring to FIG. 11, another embodiment of the video processing method in this embodiment of this application includes the following steps:

201. A terminal device receives a video encoding sequence transmitted by a server.

In this embodiment, the server obtains consecutive P frames of video frames, and the P video frames may constitute an original video sequence. A video frame may refer to a rendered video picture, or may refer to a rendered game picture, or may refer to other types of rendered pictures. The server involved in this application may be a local server (such as a game server or a video server), or may be a cloud server (such as a cloud gaming server or a cloud video server). For ease of description, this application is described by using an example in which the server is applicable to the cloud gaming server in a cloud gaming service, but this is not to be understood as a limitation on this application.

The server encodes the original video sequence by using an encoding algorithm, to generate a video encoding sequence. The encoding process may be run on a CPU of the server, or may be run on a GPU, or may be run on other encoding hardware such as an encoding chip inside a GPU or a dedicated encoding chip independent of a GPU. The encoding algorithm may use H264, H265, VP8 or VP9 algorithm, which is not limited herein.

202. The terminal device decodes the video encoding sequence to obtain a video sequence that needs to be rendered, the video sequence that needs to be rendered including X unrendered video frames, X being an integer greater than or equal to 2.

In this embodiment, the server sends the video encoding sequence to the terminal device, and the video encoding sequence includes at least two video frames. Therefore, the terminal device may decode the video encoding sequence to obtain a video sequence that needs to be rendered. The video sequence that needs to be rendered includes X unrendered video frames, and a quantity of video frames included in the video sequence that needs to be rendered is the same as a quantity of video frames included in the video encoding sequence.

203. The terminal device obtains a target video sequence according to the video sequence that needs to be rendered, the target video sequence including the X unrendered video frames and Y unrendered video frames interpolated based on at least two video frames of the X video frames, Y being an integer greater than or equal to 1.

In this embodiment, the terminal device performs frame interpolation on the X video frames in the video sequence that needs to be rendered, and may perform frame interpolation on two adjacent video frames. For example, the server performs frame interpolation on a video frame No. 1 and a video frame No. 2, and then performs frame interpolation on the video frame No. 2 and a video frame No. 3, and so on. The server may alternatively perform frame interpolation on two related video frames. For example, the server performs frame interpolation on a video frame No. 1 and a video frame No. 2, and then performs frame interpolation on the video frame No. 3 and a video frame No. 4, and so on. The server may alternatively perform frame interpolation on video frames at intervals. For example, the server performs frame interpolation on a video frame No. 1 and a video frame No. 2, and then performs frame interpolation on a video frame No. 5 and a video frame No. 6. Y video frames obtained through frame interpolation are generated based on the video sequence that needs to be rendered, and the X video frames and the Y video frames together constitute a target video sequence.

It may be understood that, resources consumed by interpolating one frame of image are less than resources consumed by rendering the one frame of image. Frame interpolation methods include, but not limited to, frame sampling, frame blending, motion compensation, and an optical flow method, and details are not described herein again.

204. The terminal device renders the target video sequence to obtain a target video.

In this embodiment, the terminal device renders the target video sequence to generate a target video, and presents the target video on a screen of the terminal device. The decoding process may be run on a CPU of the terminal device, or may be run on a GPU, or may be run on other decoding hardware such as a decoding chip inside a GPU or a dedicated decoding chip independent of a GPU. After one video frame is obtained through decoding, the video frame may be read, rendered, and then displayed on an interface through a CPU or a GPU on a terminal device side.

The following uses a scenario as an example. Assuming that the server generates 30 frames of images, and a corresponding code rate is 10 million bits per second (Mbps), the terminal device may achieve an effect of 60 frames of images after frame interpolation. Further assuming that the server generates 60 frames of images, and a corresponding code rate is 20 Mbps, the terminal device can also achieve the effect of 60 frames of images without frame interpolation. Therefore, a transmission bandwidth can be saved in a method of frame interpolation of the terminal device.

In this embodiment of this application, a video processing method is provided. The terminal device first receives a video encoding sequence transmitted by the server, next decodes the video encoding sequence to obtain a video sequence that needs to be rendered, then obtains a target video sequence according to the video sequence that needs to be rendered, and finally renders the target video sequence to obtain a target video. In the foregoing method, the server only needs to render fewer video frames, and then transmit the video frames to the terminal device. The terminal device generates a target video sequence using a frame interpolation method, and obtains a target video through rendering. Therefore, for the server, processing resources and an encoding overhead of the server can be saved in the whole process, which improves the service processing capability of the server. For the client, the transmission bandwidth is saved in the whole process.

In some embodiments, based on each embodiment corresponding to FIG. 11, in another embodiment of the video processing method provided in the embodiments of this application, the obtaining, by the terminal device, a target video sequence according to the video sequence that needs to be rendered may include:

obtaining, by the terminal device, a first unrendered video frame and a second unrendered video frame from the video sequence that needs to be rendered, the first unrendered video frame being an image of a previous frame image adjacent to the second unrendered video frame;

performing, by the terminal device, frame interpolation on the first unrendered video frame and the second unrendered video frame to obtain a target video frame, the target video frame being an image of a next frame adjacent to the first unrendered video frame, and the target video frame being an image of a previous frame adjacent to the second unrendered video frame; and generating, by the terminal device, a first video subsequence in the target video sequence according to the first unrendered video frame, the target video frame, and the second unrendered video frame, the first video subsequence including the first unrendered video frame, the target video frame, and the second unrendered video frame in order.

In this embodiment, a method of obtaining a target video sequence based on frame interpolation is described. Because a large quantity of unrendered video frames may be included in the video sequence that needs to be rendered, for ease of description, the following uses any two adjacent unrendered video frames as an example for description. In an actual application, any other two adjacent frames may be processed in a similar manner, and the details will not be described herein again.

Specifically, the terminal device first obtains two adjacent video frames, that is, a first unrendered video frame and a second unrendered video frame, from the video sequence that needs to be rendered, and then generates a new video frame based on the two unrendered video frames, that is, generates a target video frame. The target video frame is a frame located between the first unrendered video frame and the second unrendered video frame, and is equivalent to one frame of image that is additionally interpolated. The terminal device generates a first video subsequence in the target video sequence according to an order of the first unrendered video frame, the target video frame, and the second unrendered video frame. In an actual application, the server generates a series of video subsequences in a similar manner, and finally generates a target video sequence.

Figure 12:
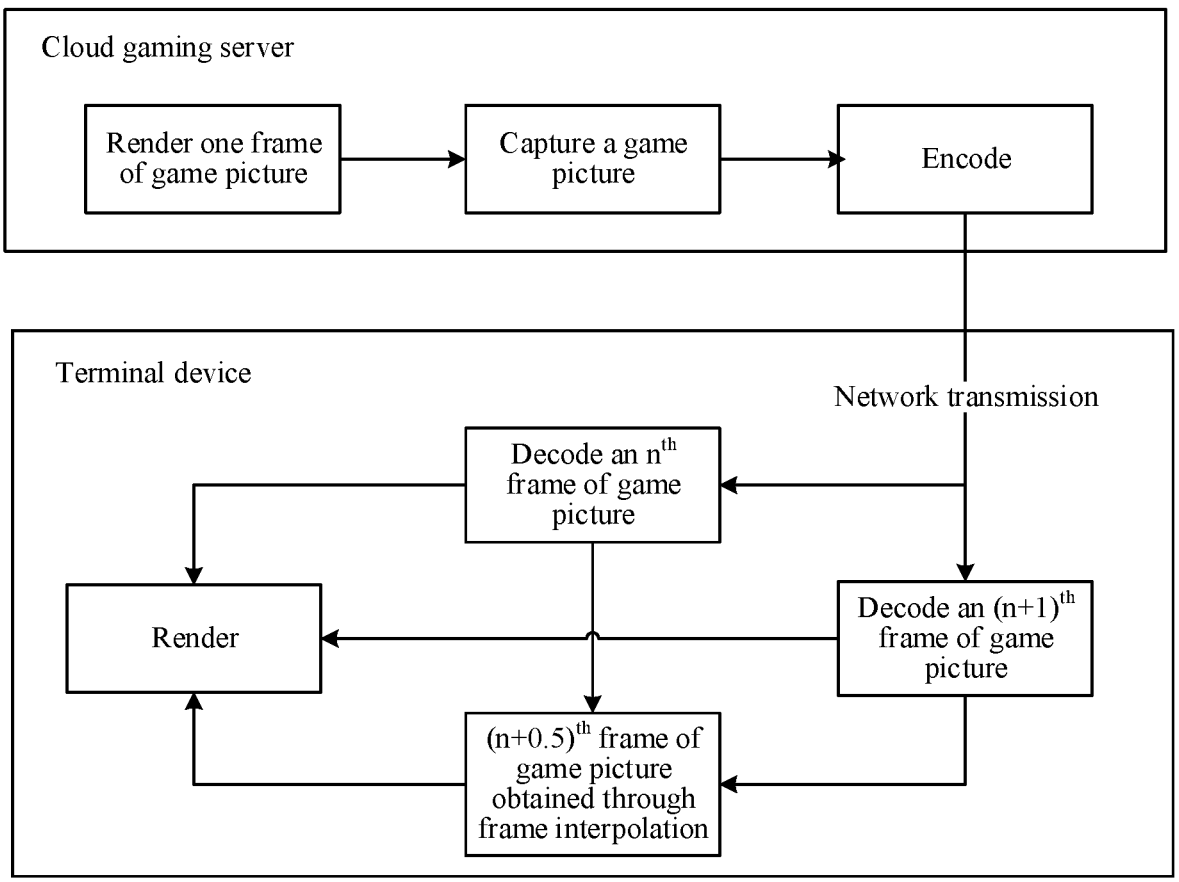
FIG. 12 is a schematic diagram of an embodiment of implementing frame interpolation based on a terminal device according to an embodiment of this application.

For ease of understanding, referring to FIG. 12, FIG. 12 is a schematic diagram of an embodiment of implementing frame interpolation based on a terminal device according to an embodiment of this application. As shown in the figure, a cloud gaming scene is used as an example. The cloud gaming server captures one frame of rendered game picture, and after obtaining a plurality of frames of rendered game picture, that is, obtaining an original video sequence, then encodes the original video sequence to obtain a video encoding sequence. The cloud gaming server transmits the video encoding sequence to the terminal device through a network. Therefore, the terminal device decodes the video encoding sequence to obtain a video sequence that needs to be rendered. Therefore, the terminal device may perform frame interpolation according to an $n^{th}$ frame of game picture and an $(n+1)^{th}$ frame of game picture, to obtain one additional frame of game picture, that is, an $(n+0.5)^{th}$ frame of game picture. Similarly, the terminal device continuously captures an $(n+2)^{th}$ frame of game picture, and performs frame interpolation on the $(n+1)^{th}$ frame of game picture and the $(n+2)^{th}$ frame of game picture, to obtain one additional frame of game picture, that is, an $(n+1.5)^{th}$ frame of game picture. By analogy, the $n^{th}$ frame of game picture, the $(n+0.5)^{th}$ frame of game picture, the $(n+1)^{th}$ frame of game picture, the $(n+1.5)^{th}$ frame of game picture, the $(n+2)^{th}$ frame of game picture, and the like together constitute a target video sequence, and the target video sequence is finally displayed on an interface of the terminal device through rendering.

Based on the foregoing description, referring to FIG. 6 again, as shown in the figure, assuming that a first unrendered video frame is an $n^{th}$ frame, and a second unrendered video frame is an $(n+1)^{th}$ frame, the first rendered video frame and the second rendered video frame are processed through frame interpolation to generate a target video frame, where the target video frame is an $(n+0.5)^{th}$ frame. It can be learned that assuming that the server renders 30 frames of pictures, actual encoded pictures may be 30 frames, and pictures outputted to the terminal device are also 30 frames. Therefore, for the terminal device, a quantity of decoded pictures is 30 frames, and through frame interpolation, 60 frames of images may be obtained through rendering. The frame interpolation has a good image effect, and is suitable for services that do not have a high requirement on a latency but a relatively high requirement on picture quality, for example, non-real-time battle games.

Further, in this embodiment of this application, a method of obtaining a target video sequence based on frame interpolation is provided. In the foregoing method, the target video sequence obtained through frame interpolation has a better image effect. However, because one frame delay is generated in a cloud service scenario, the method is more suitable for services that do not have a high requirement on the latency but a relatively high requirement on picture quality. Therefore, the picture quality can also be improved while saving the overhead of the processor on a server side.

In some embodiments, based on each embodiment corresponding to FIG. 11, in another embodiment of the video processing method provided in the embodiments of this application, the performing, by the terminal device, frame interpolation on the first unrendered video frame and the second unrendered video frame to obtain a target video frame may include:

obtaining, by the terminal device, a first frame number corresponding to the first unrendered video frame;

obtaining, by the terminal device, a second frame number corresponding to the second unrendered video frame;

obtaining, by the terminal device, a target frame number according to the first frame number and the second frame number; and obtaining, by the terminal device, K pieces of pixel information corresponding to the target video frame based on the target frame number and by using a frame interpolation prediction model, the K pieces of pixel information being used for determining the target video frame, K being an integer greater than 1.

In this embodiment, a method of performing frame interpolation based on a frame interpolation prediction model is described. Because a large quantity of unrendered video frames may be included in the video sequence that needs to be rendered, for ease of description, the following uses any two adjacent unrendered video frames as an example for description. In an actual application, any other two adjacent frames may be processed in a similar manner, and the details will not be described herein again.

Specifically, each unrendered video frame corresponds to one frame number, where a frame number of the first unrendered video frame is a first frame number, and a frame number of the second unrendered video frame is a second frame number. Assuming that the first frame number is n and the second frame number is (n+1), a method of calculating the target frame number is as follows:

$$U = [n + (n+1)]/2,$$

U representing the target frame number, and being (n+0.5).

The target frame number is inputted into a trained frame interpolation prediction model, and K pieces of pixel information are outputted through the frame interpolation prediction model. K represents a total quantity of pixels included in one video frame. When the pixel information corresponding to K pixels is obtained, a target video frame is obtained. The pixel information may be represented in the YUV form, or may be represented in the RGB form.

Further, in this embodiment of this application, a method of performing frame interpolation based on the frame interpolation prediction model is provided. In the foregoing method, each piece of pixel information in the target video frame may be predicted by using the trained frame interpolation prediction model, and these pixel information then reconstructs the target video frame, to implement the process of interpolating one frame into the video frame, thereby improving the feasibility and operability of this solution.

In some embodiments, based on each embodiment corresponding to FIG. 11, in another embodiment of the video processing method provided in the embodiments of this application, the obtaining, by the terminal device, a target video sequence according to the video sequence that needs to be rendered may include:

obtaining, by the terminal device, a first unrendered video frame and a second unrendered video frame from the video sequence that needs to be rendered, the first unrendered video frame being an image of a previous frame image adjacent to the second unrendered video frame;

performing, by the terminal device, frame interpolation on the first unrendered video frame and the second unrendered video frame to obtain a target video frame, the target video frame being an image of a next frame adjacent to the second unrendered video frame; and generating, by the terminal device, a second video subsequence in the target video sequence according to the first unrendered video frame, the target video frame, and the second unrendered video frame, the second video subsequence including the first unrendered video frame, the second unrendered video frame, and the target video frame in order.

In this embodiment, a method of obtaining a target video sequence based on frame extrapolation is described. Because a large quantity of unrendered video frames may be included in the video sequence that needs to be rendered, for ease of description, the following uses any two adjacent unrendered video frames as an example for description. In an actual application, any other two adjacent frames may be processed in a similar manner, and the details will not be described herein again.

Specifically, the terminal device first obtains two adjacent video frames, that is, a first unrendered video frame and a second unrendered video frame, from the video sequence that needs to be rendered, and then generates a new video frame based on the two unrendered video frames, that is, generates a target video frame. The target video frame is a frame located between the second unrendered video frame and a next unrendered video frame, and is equivalent to one frame of image that is additionally interpolated. The server generates a second video subsequence in the target video sequence according to an order of the first unrendered video frame, the second unrendered video frame, and the target video frame. In an actual application, the server generates a series of video subsequences in a similar manner, and finally generates a target video sequence.

Figure 13:
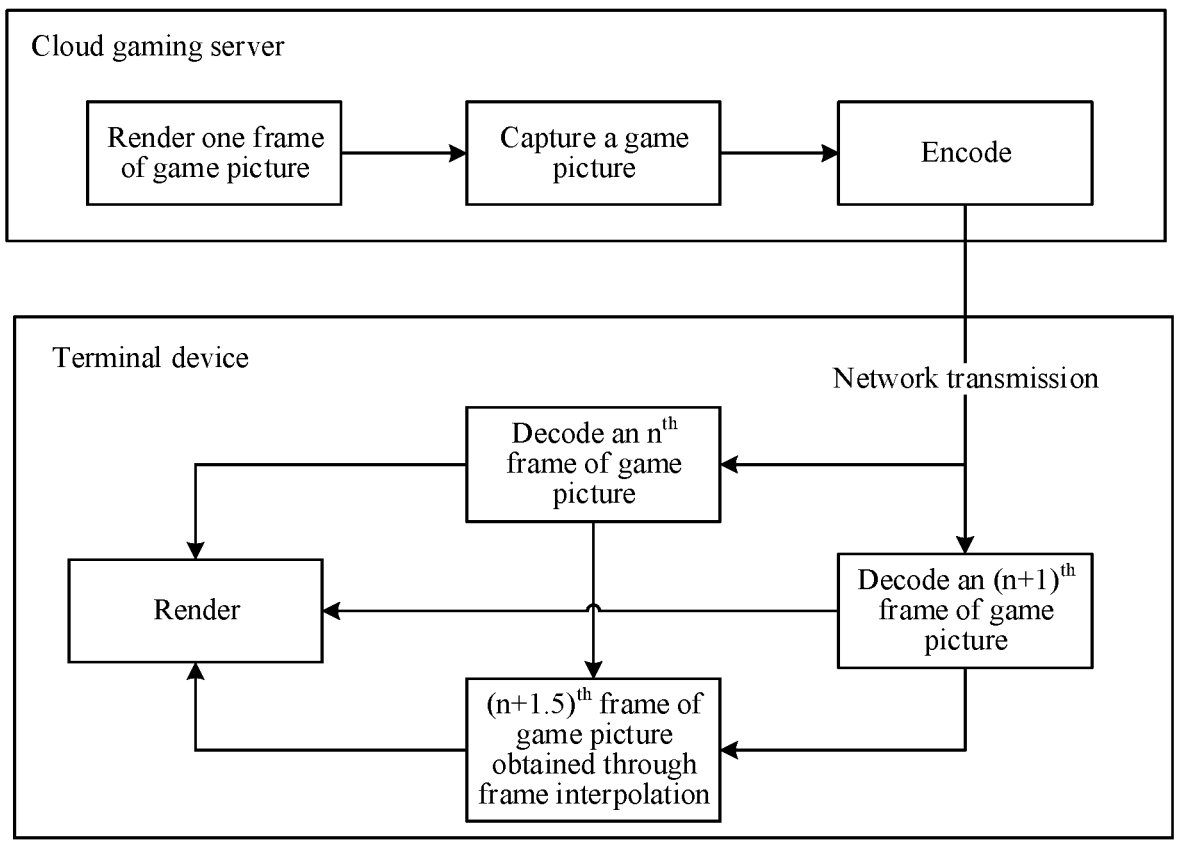
FIG. 13 is a schematic diagram of an embodiment of implementing frame extrapolation processing based on a terminal device according to an embodiment of this application.

For ease of understanding, referring to FIG. 13, FIG. 13 is a schematic diagram of an embodiment of implementing frame extrapolation processing based on a terminal device according to an embodiment of this application. As shown in the figure, a cloud gaming scene is used as an example. The cloud gaming server captures one frame of rendered game picture, and after obtaining a plurality of frames of rendered game picture, that is, obtaining an original video sequence, then encodes the original video sequence to obtain a video encoding sequence. The cloud gaming server transmits the video encoding sequence to the terminal device through a network. Therefore, the terminal device decodes the video encoding sequence to obtain a video sequence that needs to be rendered. Therefore, the terminal device may perform frame extrapolation processing according to an $n^{th}$ frame of game picture and an $(n+1)^{th}$ frame of game picture, to obtain one additional frame of game picture, that is, an $(n+1.5)^{th}$ frame of game picture. Similarly, the terminal device continuously captures an $(n+2)^{th}$ frame of game picture, and performs frame extrapolation processing on the $(n+1)^{th}$ frame of game picture and the $(n+2)^{th}$ frame of game picture, to obtain one additional frame of game picture, that is, an $(n+2.5)^{th}$ frame of game picture. By analogy, the $n^{th}$ frame of game picture, the $(n+1)^{th}$ frame of game picture, the $(n+1.5)^{th}$ frame of game picture, the $(n+2)^{th}$ frame of game picture, and the like together constitute a target video sequence, and the target video sequence is finally displayed on an interface of the terminal device through rendering.

Based on the foregoing description, referring to FIG. 10 again, as shown in the figure, it is assumed that a first unrendered video frame is an $n^{th}$ frame, a second unrendered video frame is an $(n+1)^{th}$ frame, and the first rendered video frame and the second rendered video frame are processed through frame extrapolation processing to generate a target video frame, where the target video frame is an $(n+1.5)^{th}$ frame. It can be learned that assuming that the server renders 30 frames of pictures, actual encoded pictures may be 30 frames, and pictures outputted to the terminal device are also 30 frames. Therefore, for the terminal device, a quantity of decoded pictures is 30 frames, and through frame extrapolation processing, 60 frames of images may be obtained through rendering. The frame extrapolation does not generate an additional latency generally, and is suitable for services that has a relatively high requirement on the latency, such as real-time battle games.

Further, in this embodiment of this application, a method of obtaining a target video sequence based on frame extrapolation is provided. Because an additional latency is generally not generated in the target video sequence obtained through frame extrapolation, the method is more suitable for services that have a relatively high requirement on the latency but a low requirement on the picture quality. Therefore, a phenomenon of a picture delay caused by the latency can also be avoided while saving the overhead of the processor on a server side.

In some embodiments, based on each embodiment corresponding to FIG. 11, in another embodiment of the video processing method provided in the embodiments of this application, the performing, by the terminal device, frame interpolation on the first unrendered video frame and the second unrendered video frame to obtain a target video frame may include:

obtaining, by the terminal device, a second frame number corresponding to the second unrendered video frame;

determining, by the terminal device, a next adjacent frame number of the second frame number as a third frame number;

obtaining, by the terminal device, a target frame number according to an average value of the second frame number and the third frame number; and obtaining, by the terminal device, K pieces of pixel information corresponding to the target video frame based on the target frame number and by using a frame interpolation prediction model, the K pieces of pixel information being used for determining the target video frame, K being an integer greater than 1.

In this embodiment, a method of performing frame extrapolation based on a frame interpolation prediction model is described. Because a large quantity of unrendered video frames may be included in the video sequence that needs to be rendered, for ease of description, the following uses any two adjacent unrendered video frames as an example for description. In an actual application, any other two adjacent frames may be processed in a similar manner, and the details will not be described herein again.

Specifically, each unrendered video frame corresponds to one frame number, where a frame number of the first unrendered video frame is a first frame number, and a frame number of the second unrendered video frame is a second frame number. Assuming that the second frame number is (n+1) and the third frame number is (n+2), a method of calculating the target frame number is as follows:

$$U = [n+1+(n+2)]/2,$$

U representing the target frame number, and being (n+1.5).

The target frame number is inputted into a trained frame interpolation prediction model, and K pieces of pixel information are outputted through the frame interpolation prediction model. K represents a total quantity of pixels included in one video frame. When the pixel information corresponding to K pixels is obtained, a target video frame is obtained. The pixel information may be represented in the YUV form, or may be represented in the RGB form.

The training method of the frame interpolation prediction model has been described in the foregoing embodiments, and therefore details are not described herein again.

Further, in this embodiment of this application, a method of performing frame extrapolation based on the frame interpolation prediction model is provided. In the foregoing method, each piece of pixel information in the target video frame may be predicted by using the trained frame interpolation prediction model, and these pixel information then reconstructs the target video frame, to implement the process of extrapolating one frame into the video frame, thereby improving the feasibility and operability of this solution.

Figure 14:
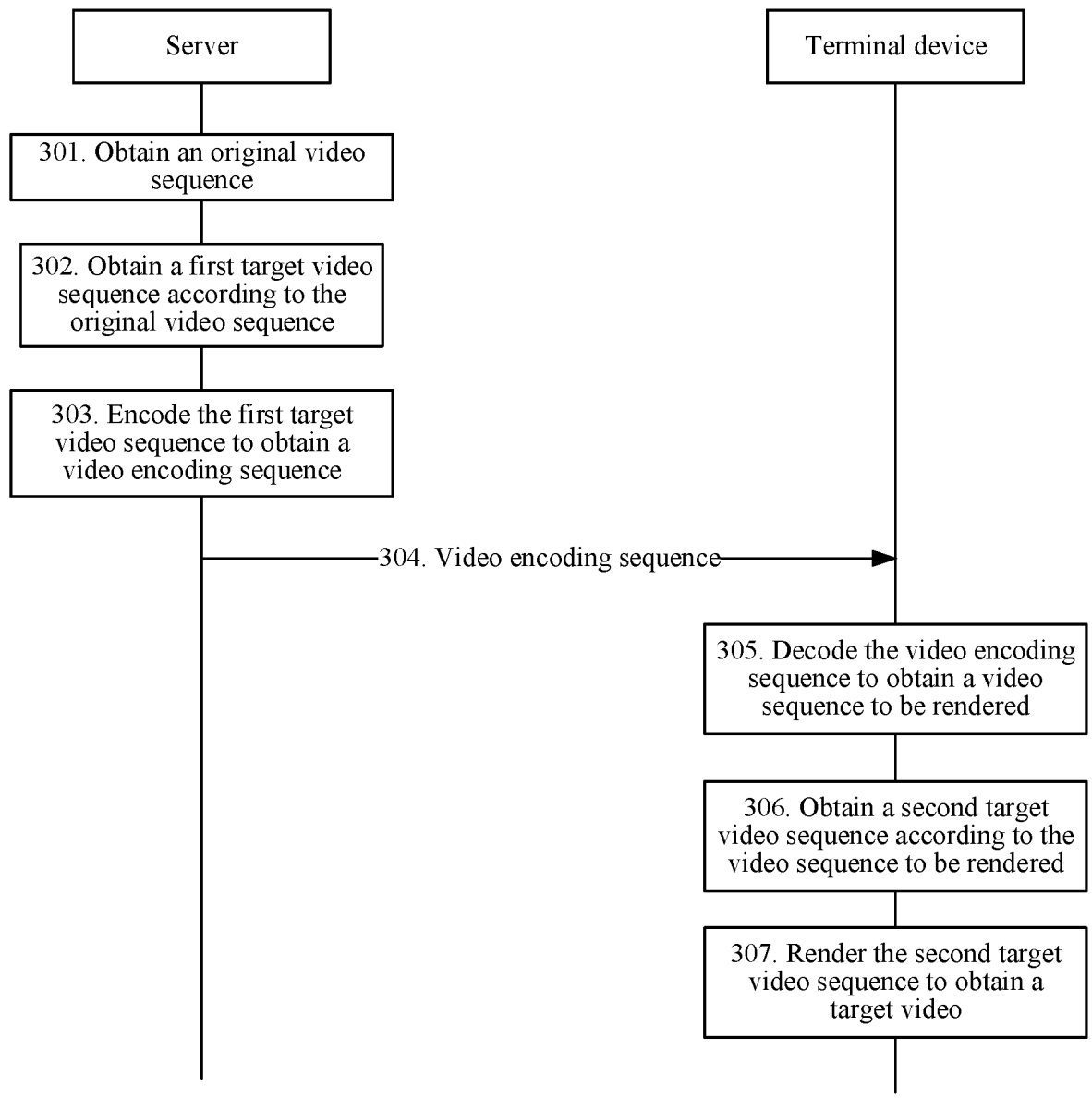
FIG. 14 is a schematic diagram of an interaction procedure of a video processing method according to an embodiment of this application.

With reference to the foregoing description, a video processing method in this application is described below from the perspective of a video processing system. Referring to FIG. 14, another embodiment of the video processing method in this embodiment of this application includes the following steps:

301. A server obtains an original video sequence, the original video sequence including P video frames obtained through rendering, P being an integer greater than or equal to 2.

In this embodiment, the server obtains consecutive P frames of pictures, that is, P video frames, and the P video frames may constitute an original video sequence. A video frame may refer to a rendered video picture, or may refer to a rendered game picture, or may refer to other types of rendered pictures. The server involved in this application may be a local server (such as a game server or a video server), or may be a cloud server (such as a cloud gaming server or a cloud video server). For ease of description, this application is described by using an example in which the server is a cloud gaming server applicable to a cloud gaming service. In addition, in an actual application, a CPU and a GPU may perform rendering tasks, but this is not to be understood as a limitation on this application.

302. The server obtains a first target video sequence according to the original video sequence, the first target video sequence including the P video frames obtained through rendering and Q unrendered video frames interpolating based on at least two video frames of the P video frames, Q being an integer greater than or equal to 1.

In this embodiment, the server performs frame interpolation on the P video frames in the original video sequence to obtain a first target video sequence, and resources consumed by interpolating one frame of image are less than resources consumed by rendering the one frame of image. It may be understood that, the frame interpolation method is similar to that of step 102, and therefore details are not described herein again.

303. The server encodes the first target video sequence to obtain a video encoding sequence.

In this embodiment, the server encodes a first target video sequence by using an encoding algorithm, to generate a video encoding sequence. The encoding process may be run on a CPU of the server, or may be run on a GPU, or may be run on other encoding hardware such as an encoding chip inside a GPU or a dedicated encoding chip independent of a GPU. The encoding algorithm may use H264, H265, VP8 or VP9 algorithm, which is not limited herein. It may be understood that, for the encoding process, refer to the content described in step 103, and therefore details are not described herein again.

304. The server transmits the video encoding sequence to a terminal device.

In this embodiment, the server transmits the video encoding sequence to a terminal device through a network, and therefore the terminal device receives the video encoding sequence, where the video encoding sequence includes (P+Q) video frames.

305. The terminal device decodes the video encoding sequence to obtain a video sequence that needs to be rendered, the video sequence that needs to be rendered including (P+Q) unrendered video frames.

In this embodiment, the terminal device may decode the video encoding sequence to obtain a video sequence that needs to be rendered. In addition, the video sequence that needs to be rendered includes (P+Q) unrendered video frames, that is, a quantity of video frames included in the video sequence that needs to be rendered is the same as a quantity of video frames included in the video encoding sequence.

306. The terminal device obtains a second target video sequence according to the video sequence that needs to be rendered, the second target video sequence including the (P+Q) unrendered video frames and Y unrendered video frames interpolated based on at least two video frames of the (P+Q) video frames, Y being an integer greater than or equal to 1.

In this embodiment, the terminal device performs frame interpolation on (P+Q) video frames in the video sequence that needs to be rendered, and may perform frame interpolation on two adjacent video frames, or may perform frame interpolation on two related video frames, or may perform frame interpolation on video frames at intervals. This is not limited herein. Y video frames obtained through frame interpolation are generated based on the video sequence that needs to be rendered, and the (P+Q) video frames and the Y video frames together constitute a second target video sequence.

It may be understood that, frame interpolation methods include, but not limited to, frame sampling, frame blending, motion compensation, and an optical flow method, and details are not described herein again.

307. The terminal device renders the second target video sequence to obtain a target video.

In this embodiment, the terminal device renders the second target video sequence to generate a target video, and presents the target video on a screen of the terminal device. The decoding process may be run on a CPU of the terminal device, or may be run on a GPU, or may be run on other decoding hardware such as a decoding chip inside a GPU or a dedicated decoding chip independent of a GPU. After one video frame is obtained through decoding, the video frame may be read, rendered, and then displayed on an interface through a CPU or a GPU on a terminal device side.

In this embodiment of this application, a video processing method is provided. Both the server side and the terminal device side generate video frames using a frame interpolation method. In the foregoing method, the performance of the server and the performance of terminal device may be integrated. For the server, the server only needs to render a part of video frames, and then perform frame interpolation based on the rendered video frames to obtain a to-be-encoded video sequence. For the terminal device, the terminal device generates a target video sequence using a frame interpolation method, and obtains a target video through rendering. However, resources consumed through frame interpolation are less than resources required for rendering. Therefore, this can not only save processing resources on the server side, reduce an overhead of the processor, and improve the service processing capability of the server, but also have a lower requirement on the performance of the terminal device, thereby effectively balancing the performance of the server against the performance of the terminal device. For the client, the transmission bandwidth is saved in the whole process.

Based on the video processing method described in FIG. 14, four frame interpolation methods are separately described below.

Figure 15:
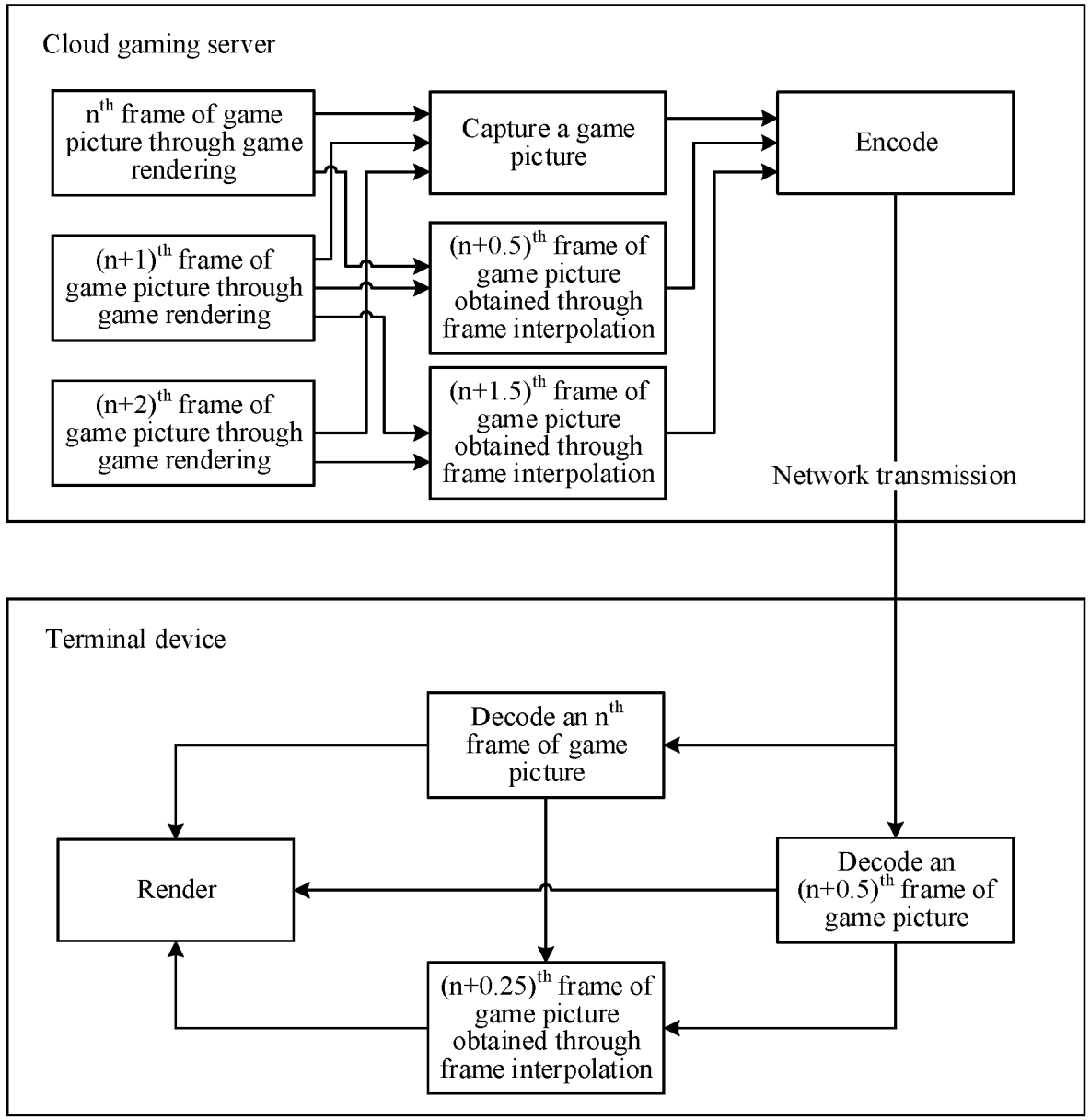
FIG. 15 is a schematic diagram of an embodiment of implementing frame interpolation based on a video processing system according to an embodiment of this application.

The first method is a processing method in which both the server and the terminal device use frame interpolation. Referring to FIG. 15, FIG. 15 is a schematic diagram of an embodiment of implementing frame interpolation based on a video processing system according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame interpolation on the $n^{th}$ frame of game picture and the $(n+1)^{th}$ frame of game picture, to obtain one additional frame of game picture, that is, an $(n+0.5)^{th}$ frame of game picture. Similarly, the cloud gaming server continuously captures an $(n+2)^t$ frame of game picture, and performs frame interpolation on the $(n+1)^{th}$ frame of game picture and the $(n+2)^{th}$ frame of game picture, to obtain one additional frame of game picture, that is, an $(n+1.5)^{th}$ frame of game picture. By analogy, the $n^{th}$ frame of game picture, the $(n+0.5)^{th}$ frame of game picture, the $(n+1)^{th}$ frame of game picture, the $(n+1.5)^{th}$ frame of game picture, the $(n+2)^{th}$ frame of game picture, and the like together constitute a first target video sequence, and the first target video sequence is then encoded to obtain a video encoding sequence. The cloud gaming server transmits the video encoding sequence to the terminal device through a network. Therefore, the terminal device decodes the video encoding sequence to obtain a video sequence that needs to be rendered. The cloud gaming server may then perform frame interpolation according to the $n^{th}$ frame of game picture and the $(n+0.5)^{th}$ frame of game picture, to obtain one additional frame of game picture, that is, an $(n+0.25)^{th}$ frame of game picture. Similarly, the terminal device continuously captures an $(n+1)^{th}$ frame of game picture, and performs frame interpolation on the $(n+0.5)^{th}$ frame of game picture and the $(n+1)^{th}$ frame of game picture, to obtain one additional frame of game picture, that is, an $(n+0.75)^{th}$ frame of game picture. By analogy, the $n^{th}$ frame of game picture, the $(n+0.25)^{th}$ frame of game picture, the $(n+0.5)^{th}$ frame of game picture, the $(n+0.75)^{th}$ frame of game picture, the $(n+1)^{th}$ frame of game picture, and the like together constitute a second target video sequence, and the target video sequence is displayed on an interface of the terminal device through rendering.

Figure 16:
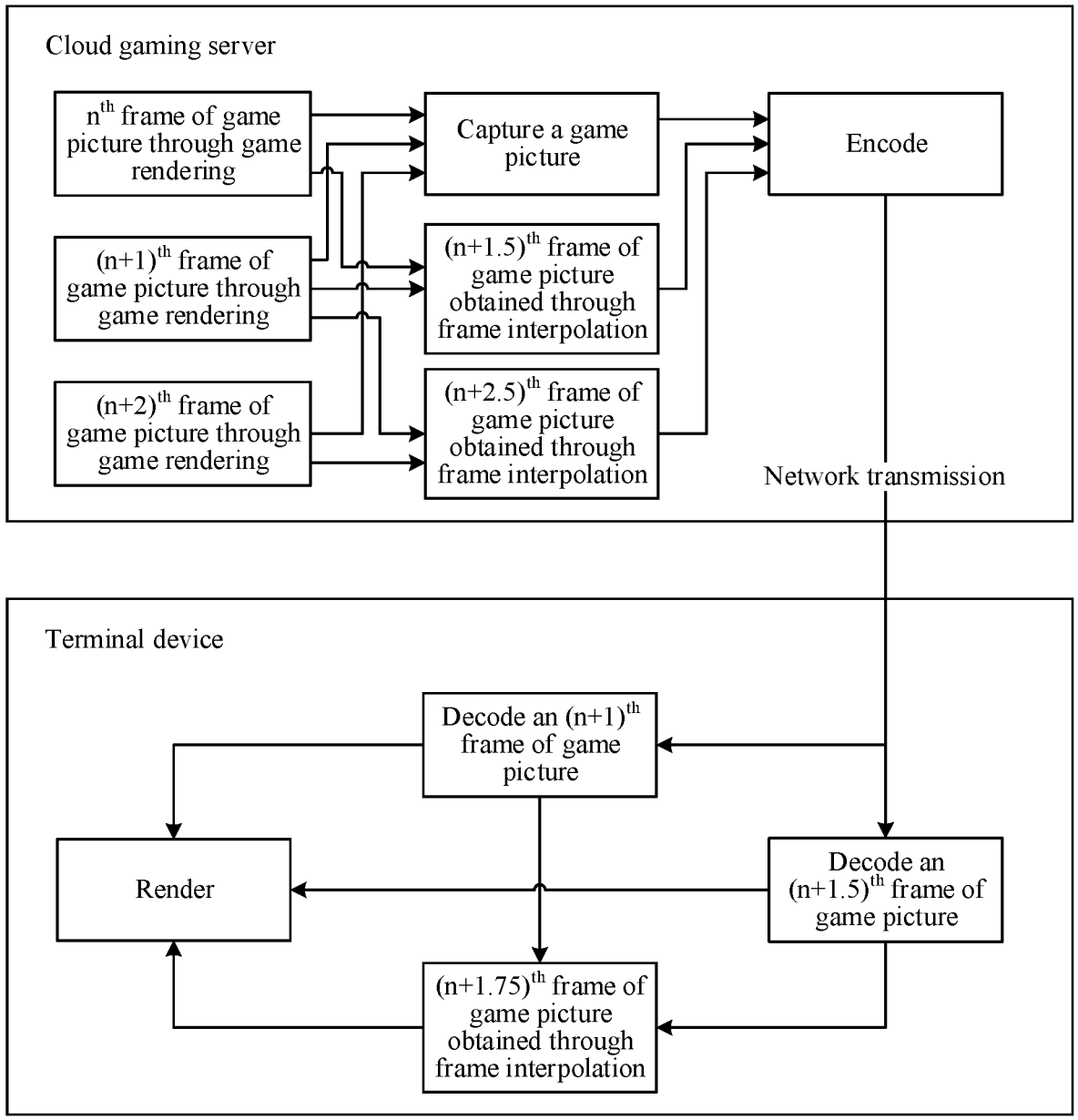
FIG. 16 is a schematic diagram of an embodiment of implementing frame extrapolation processing based on a video processing system according to an embodiment of this application.

The second method is a processing method in which both the server and the terminal device use a frame extrapolation. Referring to FIG. 16, FIG. 16 is a schematic diagram of an embodiment of implementing frame extrapolation processing based on a video processing system according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame extrapolation processing on the $n^{th}$ frame of game picture and the $(n+1)^{th}$ frame of game picture, to obtain one additional frame of game picture, that is, an $(n+1.5)^{th}$ frame of game picture. Similarly, the cloud gaming server continuously captures an $(n+2)^{th}$ frame of game picture, and performs frame extrapolation processing on the $(n+1)^{th}$ frame of game picture and the $(n+2)^{th}$ frame of game picture, to obtain one additional frame of game picture, that is, an $(n+2.5)^{th}$ frame of game picture. By analogy, the $n^{th}$ frame of game picture, the $(n+1)^{th}$ frame of game picture, the $(n+1.5)^{th}$ frame of game picture, the $(n+2)^{th}$ frame of game picture, the $(n+2.5)^{th}$ frame of game picture, and the like together constitute a first target video sequence, and the first target video sequence is then encoded to obtain a video encoding sequence. The cloud gaming server transmits the video encoding sequence to the terminal device through a network. Therefore, the terminal device decodes the video encoding sequence to obtain a video sequence that needs to be rendered. The cloud gaming server may then perform frame extrapolation processing according to the $(n+1)^{th}$ frame of game picture and the $(n+1.5)^{th}$ frame of game picture, to obtain one additional frame of game picture, that is, an $(n+1.75)^{th}$ frame of game picture. Similarly, the terminal device continuously captures an $(n+2)^{th}$ frame of game picture, and performs frame extrapolation processing on the $(n+1.5)^{th}$ frame of game picture and the $(n+2)^{th}$ frame of game picture, to obtain one additional frame of game picture, that is, an $(n+2.25)^{th}$ frame of game picture. By analogy, the $n^{th}$ frame of game picture, the $(n+1)^{th}$ frame of game picture, the $(n+1.5)^{th}$ frame of game picture, the $(n+1.75)^{th}$ frame of game picture, the $(n+2)^{th}$ frame of game picture, the $(n+2.25)^{th}$ frame of game picture, the $(n+2.5)^{th}$ frame of game picture, and the like together constitute a second target video sequence, and the target video sequence is displayed on an interface of the terminal device through rendering.

Figure 17:
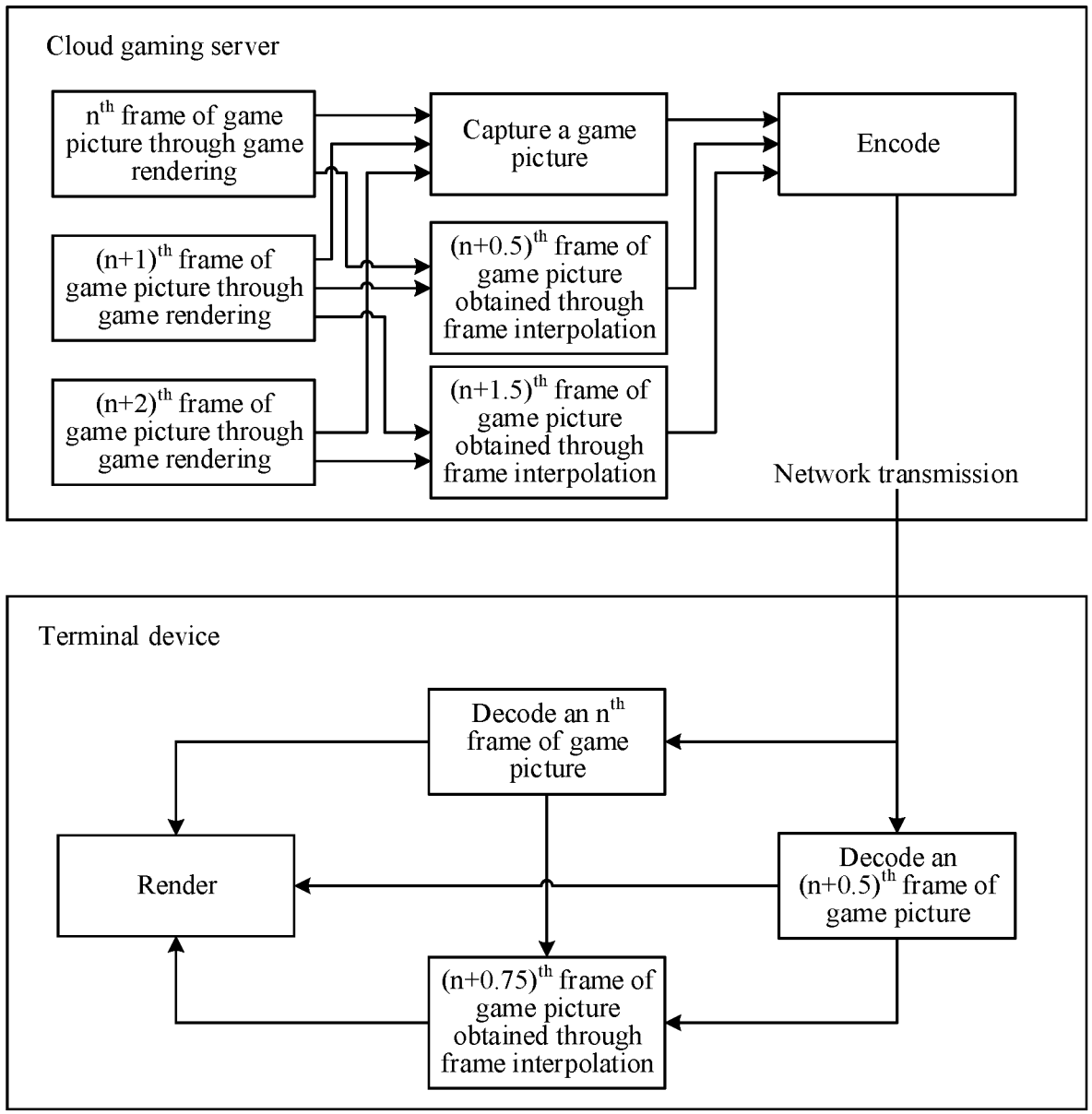
FIG. 17 is a schematic diagram of an embodiment of implementing frame interpolation/extrapolation processing based on a video processing system according to an embodiment of this application.

The third method is a processing method in which the server uses a frame interpolation, while the terminal device uses a frame extrapolation processing method. Referring to FIG. 17, FIG. 17 is a schematic diagram of an embodiment of implementing frame interpolation/extrapolation processing based on a video processing system according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame interpolation on the $n^{th}$ frame of game picture and the $(n+1)^{th}$ frame of game picture, to obtain one additional frame of game picture, that is, an $(n+0.5)^{th}$ frame of game picture. Similarly, the cloud gaming server continuously captures an $(n+2)^{th}$ frame of game picture, and performs frame interpolation on the $(n+1)^{th}$ frame of game picture and the $(n+2)^{th}$ frame of game picture, to obtain one additional frame of game picture, that is, an $(n+1.5)^{th}$ frame of game picture. By analogy, the $n^{th}$ frame of game picture, the $(n+0.5)^{th}$ frame of game picture, the $(n+1)^{th}$ frame of game picture, the $(n+1.5)^{th}$ frame of game picture, the $(n+2)^{th}$ frame of game picture, and the like together constitute a first target video sequence, and the first target video sequence is then encoded to obtain a video encoding sequence. The cloud gaming server transmits the video encoding sequence to the terminal device through a network. Therefore, the terminal device decodes the video encoding sequence to obtain a video sequence that needs to be rendered. The cloud gaming server may then perform frame extrapolation processing according to the $n^{th}$ frame of game picture and the $(n+0.5)^{th}$ frame of game picture, to obtain one additional frame of game picture, that is, an $(n+0.75)^{th}$ frame of game picture. Similarly, the terminal device continuously captures an $(n+1)^{th}$ frame of game picture, and performs frame extrapolation processing on the $(n+0.5)^{th}$ frame of game picture and the $(n+1)^{th}$ frame of game picture, to obtain one additional frame of game picture, that is, an $(n+1.25)^{th}$ frame of game picture. By analogy, the $n^{th}$ frame of game picture, the $(n+0.5)^{th}$ frame of game picture, the $(n+0.75)^{th}$ frame of game picture, the $(n+1)^{th}$ frame of game picture, the $(n+1.25)^{th}$ frame of game picture, the $(n+1.5)^{th}$ frame of game picture, the $(n+1.75)^{th}$ frame of game picture, the $(n+2)^{th}$ frame of game picture, and the like together constitute a second target video sequence, and the target video sequence is displayed on an interface of the terminal device through rendering.

Figure 18:
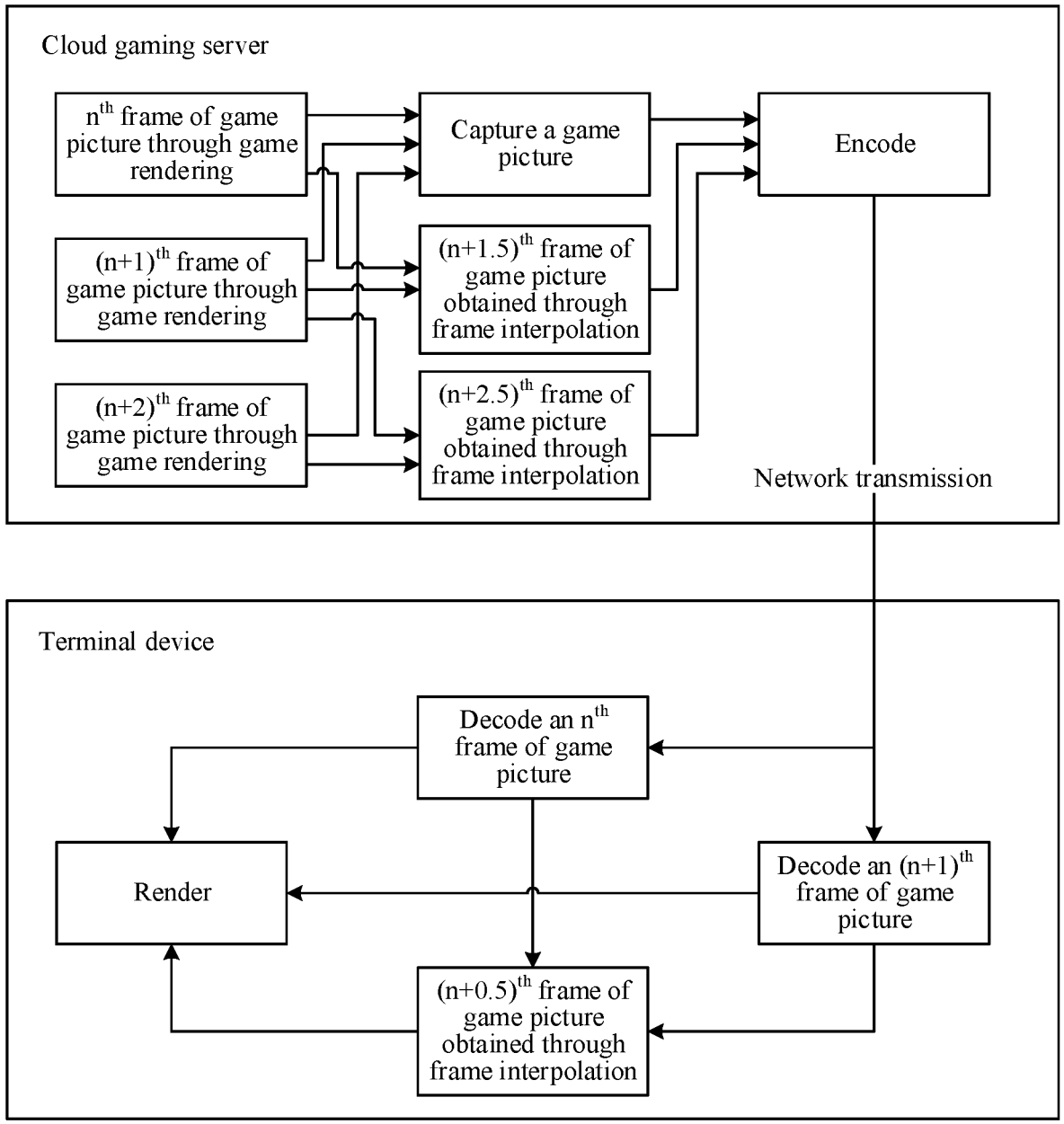
FIG. 18 is a schematic diagram of another embodiment of implementing frame interpolation/extrapolation processing based on a video processing system according to an embodiment of this application.

The fourth method is a processing method in which the server uses a frame extrapolation, while the terminal device uses a frame interpolation method. Referring to FIG. 18, FIG. 18 is a schematic diagram of another embodiment of implementing frame interpolation/extrapolation processing based on a video processing system according to an embodiment of this application. As shown in the figure, a cloud gaming scene is used as an example. The cloud gaming server captures a rendered $n^{th}$ frame of game picture and a rendered $(n+1)^{th}$ frame of game picture, and performs frame extrapolation processing on the $n^{th}$ frame of game picture and the $(n+1)^{th}$ frame of game picture, to obtain one additional frame of game picture, that is, an $(n+1.5)^{th}$ frame of game picture. Similarly, the cloud gaming server continuously captures an $(n+2)^{th}$ frame of game picture, and performs frame extrapolation processing on the $(n+1)$th frame of game picture and the $(n+2)^{th}$ frame of game picture, to obtain one additional frame of game picture, that is, an $(n+2.5)^{th}$ frame of game picture. By analogy, the $n^{th}$ frame of game picture, the $(n+1)^{th}$ frame of game picture, the $(n+1.5)^{th}$ frame of game picture, the $(n+2)^{th}$ frame of game picture, the $(n+2.5)^{th}$ frame of game picture, and the like together constitute a first target video sequence, and the first target video sequence is then encoded to obtain a video encoding sequence. The cloud gaming server transmits the video encoding sequence to the terminal device through a network. Therefore, the terminal device decodes the video encoding sequence to obtain a video sequence that needs to be rendered. The cloud gaming server may then perform frame interpolation according to the $n^{th}$ frame of game picture and the $(n+1)^{th}$ frame of game picture, to obtain one additional frame of game picture, that is, an $(n+0.5)^{th}$ frame of game picture. Similarly, the terminal device continuously captures an $(n+1.5)^{th}$ frame of game picture, and performs frame interpolation on the $(n+1)^{th}$ frame of game picture and the $(n+1.5)^{th}$ frame of game picture, to obtain one additional frame of game picture, that is, an $(n+1.25)^{th}$ frame of game picture. By analogy, the $n^{th}$ frame of game picture, the $(n+0.5)^{th}$ frame of game picture, the $(n+1)^{th}$ frame of game picture, the $(n+1.25)^{th}$ frame of game picture, the $(n+1.5)^{th}$ frame of game picture, the $(n+1.75)^{th}$ frame of game picture, the $(n+2)^{th}$ frame of game picture, the $(n+2.25)^{th}$ frame of game picture, the $(n+2.5)^{th}$ frame of game picture, and the like together constitute a second target video sequence, and the target video sequence is displayed on an interface through rendering.

Figure 19:
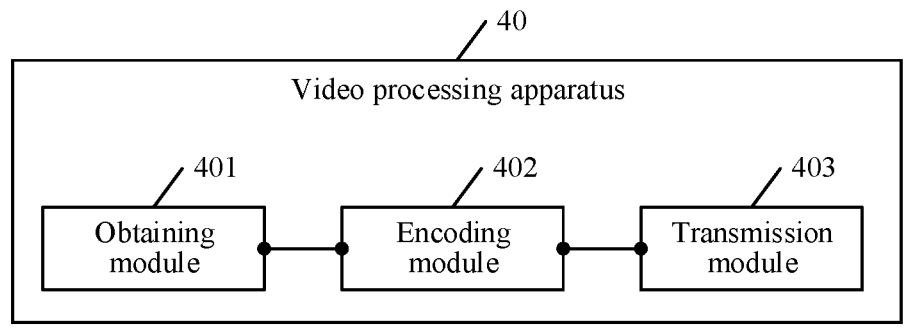
FIG. 19 is a schematic diagram of an embodiment of a video processing apparatus according to an embodiment of this application.

A video processing apparatus in this application is described below in detail. Referring to FIG. 19, FIG. 19 is a schematic diagram of an embodiment of a video processing apparatus according to an embodiment of this application. The video processing apparatus 40 includes:

an obtaining module 401, configured to obtain an original video sequence, the original video sequence including P video frames obtained through rendering, P being an integer greater than or equal to 2, the obtaining module 401 being further configured to obtain a target video sequence according to the original video sequence, the target video sequence including the P video frames and Q unrendered video frames interpolated based on at least two video frames of the P video frames, Q being an integer greater than or equal to 1;

an encoding module 402, configured to encode the target video sequence to obtain a video encoding sequence; and a transmission module 403, configured to transmit the video encoding sequence to a terminal device, so that the terminal device decodes the video encoding sequence to obtain a video sequence that needs to be rendered.

In some embodiments, based on the embodiment corresponding to FIG. 19, in another embodiment of the video processing apparatus 40 provided in this embodiment of this application, an obtaining module 401 is specifically configured to:
obtain a first rendered video frame and a second rendered video frame from the original video sequence, the first rendered video frame being an image of a previous frame adjacent to the second rendered video frame;

perform frame interpolation on the first rendered video frame and the second rendered video frame to obtain a target video frame, the target video frame being an image of a next frame adjacent to the first rendered video frame, the target video frame being an image of a previous frame adjacent to the second rendered video frame, and the target video frame being an unrendered video frame; and generate a first video subsequence in the target video sequence according to the first rendered video frame, the target video frame, and the second rendered video frame, the first video subsequence including the first rendered video frame, the target video frame, and the second rendered video frame in order.

In some embodiments, based on the embodiment corresponding to FIG. 19, in another embodiment of the video processing apparatus 40 provided in this embodiment of this application, an obtaining module 401 is specifically configured to:
obtain a first frame number corresponding to the first rendered video frame;
obtain a second frame number corresponding to the second rendered video frame;
obtain a target frame number according to the first frame number and the second frame number; and
obtain K pieces of pixel information corresponding to the target video frame based on the target frame number and by using a frame interpolation prediction model, the K pieces of pixel information being used for determining the target video frame, K being an integer greater than 1.

In some embodiments, based on the embodiment corresponding to FIG. 19, in another embodiment of the video processing apparatus 40 provided in this embodiment of this application, an obtaining module 401 is specifically configured to:
obtain a first rendered video frame and a second rendered video frame from the original video sequence, the first rendered video frame being an image of a previous frame adjacent to the second rendered video frame;
perform frame interpolation on the first rendered video frame and the second rendered video frame to obtain a target video frame, the target video frame being an image of a next frame adjacent to the second rendered video frame, and the target video frame being an unrendered video frame; and
generate a second video subsequence in the target video sequence according to the first rendered video frame, the target video frame, and the second rendered video frame, the second video subsequence including the first rendered video frame, the second rendered video frame, and the target video frame in order.

In some embodiments, based on the embodiment corresponding to FIG. 19, in another embodiment of the video processing apparatus 40 provided in this embodiment of this application, an obtaining module 401 is specifically configured to:
obtain a second frame number corresponding to the second rendered video frame;
determine a next adjacent frame number of the second frame number as a third frame number;
obtain a target frame number according to the second frame number and the third frame number; and
obtain K pieces of pixel information corresponding to the target video frame based on the target frame number and by using a frame interpolation prediction model, the K pieces of pixel information being used for determining the target video frame, K being an integer greater than 1.

Figure 20:
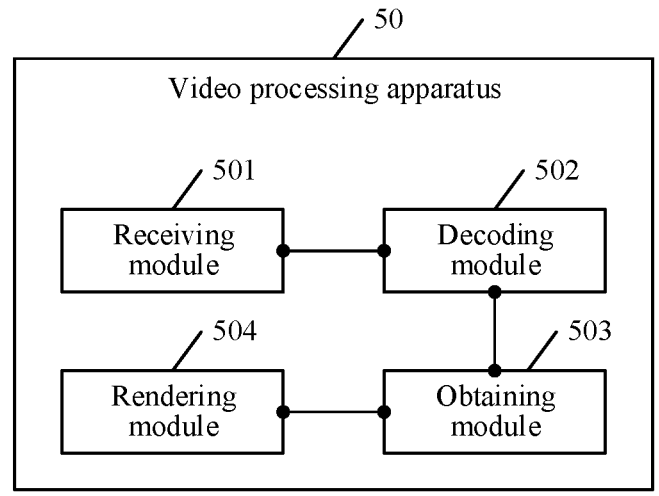
FIG. 20 is a schematic diagram of another embodiment of a video processing apparatus according to an embodiment of this application.

A video processing apparatus in this application is described below in detail. Referring to FIG. 20, FIG. 20 is a schematic diagram of an embodiment of a video processing apparatus according to an embodiment of this application. The video processing apparatus 50 includes:

a receiving module 501, configured to receive a video encoding sequence transmitted by a server;
a decoding module 502, configured to decode the video encoding sequence to obtain a video sequence that needs to be rendered, the video sequence that needs to be rendered including X unrendered video frames, X being an integer greater than or equal to 2;
an obtaining module 503, configured to obtain a target video sequence according to the video sequence that needs to be rendered, the target video sequence including the X unrendered video frames and Y unrendered video frames interpolated based on at least two video frames of the X video frames, Y being an integer greater than or equal to 1; and
a rendering module 504, configured to render the target video sequence to obtain a target video.

In some embodiments, based on the embodiment corresponding to FIG. 20, in another embodiment of the video processing apparatus 50 provided in this embodiment of this application, an obtaining module 503 is specifically configured to:
obtain a first unrendered video frame and a second unrendered video frame from the video sequence that needs to be rendered, the first unrendered video frame being an image of a previous frame image adjacent to the second unrendered video frame;
perform frame interpolation on the first unrendered video frame and the second unrendered video frame to obtain a target video frame, the target video frame being an image of a next frame adjacent to the first unrendered video frame, and the target video frame being an image of a previous frame adjacent to the second unrendered video frame; and
generate a first video subsequence in the target video sequence according to the first unrendered video frame, the target video frame, and the second unrendered video frame, the first video subsequence including the first unrendered video frame, the target video frame, and the second unrendered video frame in order.

In some embodiments, based on the embodiment corresponding to FIG. 20, in another embodiment of the video processing apparatus 50 provided in this embodiment of this application, an obtaining module 503 is specifically configured to:
obtain a first frame number corresponding to the first unrendered video frame;
obtain a second frame number corresponding to the second unrendered video frame;
obtain a target frame number according to the first frame number and the second frame number; and
obtain K pieces of pixel information corresponding to the target video frame based on the target frame number and by using a frame interpolation prediction model, the K pieces of pixel information being used for determining the target video frame, K being an integer greater than 1.

In some embodiments, based on the embodiment corresponding to FIG. 20, in another embodiment of the video processing apparatus 50 provided in this embodiment of this application, an obtaining module 503 is specifically configured to:
obtain a first unrendered video frame and a second unrendered video frame from the video sequence that needs to be rendered, the first unrendered video frame being an image of a previous frame image adjacent to the second unrendered video frame;

perform frame interpolation on the first unrendered video frame and the second unrendered video frame to obtain a target video frame, the target video frame being an image of a next frame adjacent to the second unrendered video frame; and generate a second video subsequence in the target video sequence according to the first unrendered video frame, the target video frame, and the second unrendered video frame, the second video subsequence including the first unrendered video frame, the second unrendered video frame, and the target video frame in order.

In some embodiments, based on the embodiment corresponding to FIG. 20, in another embodiment of the video processing apparatus 50 provided in this embodiment of this application, an obtaining module 503 is specifically configured to:
obtain a second frame number corresponding to the second unrendered video frame;
determine a next adjacent frame number of the second frame number as a third frame number;
obtain a target frame number according to the second frame number and the third frame number; and
obtain K pieces of pixel information corresponding to the target video frame based on the target frame number and by using a frame interpolation prediction model, the K pieces of pixel information being used for determining the target video frame, K being an integer greater than 1.

Figure 21:
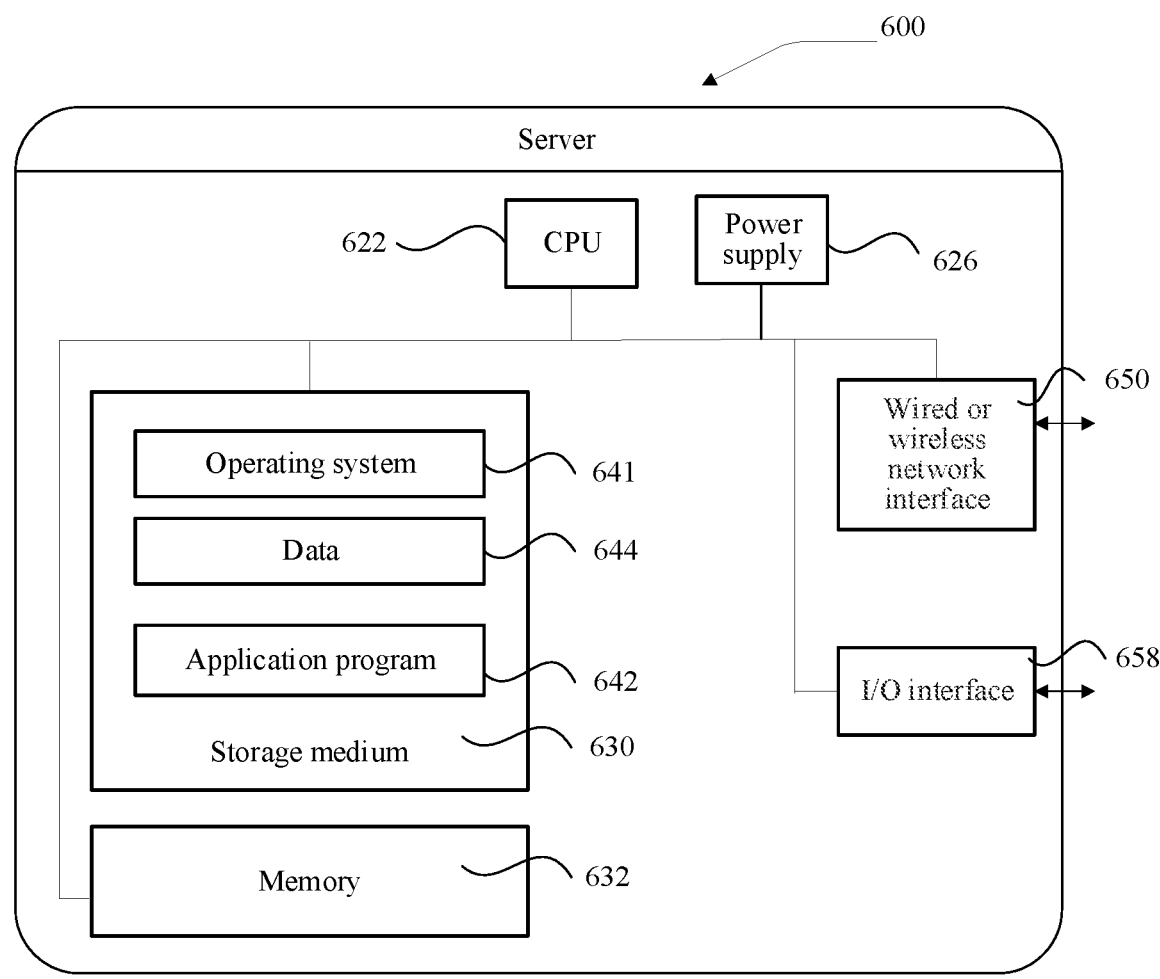
FIG. 21 is a schematic structural diagram of a server according to an embodiment of this application.

FIG. 21 is a schematic structural diagram of a server according to an embodiment of this application. The server 600 may vary greatly due to different configurations or performance, and may include one or more CPUs 622 (for example, one or more processors) and a memory 632, and one or more storage media 630 (for example, one or more mass storage devices) that store application programs 642 or data 644. The memory 632 and the storage medium 630 may implement transient storage or permanent storage. A program stored in the storage medium 630 may include one or more modules (not shown in the figure), and each module may include a series of instruction operations on the server. Furthermore, the CPU 622 may be configured to communicate with the storage medium 630, and perform, on the server 600, the series of instruction operations in the storage medium 630.

The server 600 may further include one or more power supplies 626, one or more wired or wireless network interfaces 650, one or more input/output interfaces 658, and/or one or more operating systems 641 such as Windows Server™, Mac OS X™, Unix™, Linux™, and FreeBSD™.

The steps performed by the server in the foregoing embodiments may be based on the server structure shown in FIG. 21.

Figure 22:
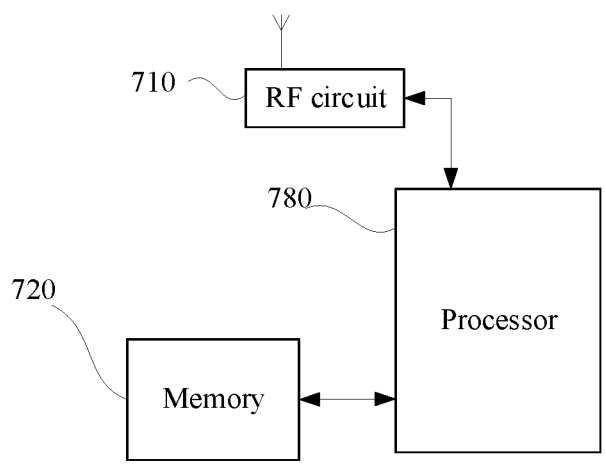
FIG. 22 is a schematic structural diagram of a terminal device according to an embodiment of this application.

An embodiment of this application further provides another video processing apparatus. As shown in FIG. 22, for ease of description, only a part related to this embodiment of this application is shown. For a specific technical detail not disclosed, refer to the method part in the embodiments of this application. The terminal device may be any terminal device including a mobile phone, a tablet computer, a personal digital assistant (PDA), a point of sales (POS), an on-board computer, and an over the top TV, and the terminal device being a mobile phone is used as an example.

FIG. 22 is a block diagram of a structure of a part of a mobile phone related to a terminal device according to an embodiment of this application. Referring to FIG. 22, the mobile phone includes components such as a radio frequency (RF) circuit 710, a memory 720, and a processor 780. Persons skilled in the art may understand that the structure of the mobile phone shown in FIG. 22 does not constitute a limitation on the mobile phone, and the mobile phone may include more or fewer components than those shown in the figure, or some components may be combined, or a different component deployment may be used.

The following makes a specific description of the components of the mobile phone with reference to FIG. 22.

The RF circuit 710 may be configured to receive and transmit a signal in an information receiving and transmission process or a call process, and in particular, after receiving downlink information of a base station, transmit the downlink information to the processor 780 for processing. In addition, the RF circuit transmits uplink data to the base station. Generally, the RF circuit 710 includes, but not limited to, an antenna, at least one amplifier, a transceiver, a coupler, a low noise amplifier (LNA), and a duplexer. In addition, the RF circuit 710 may also communicate with a network and another device through wireless communications. The wireless communication may use any communication standard or protocol, including, but not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 720 may be configured to store a software program and a module. The processor 780 runs the software program and the module that are stored in the memory 720, to perform various functional applications and data processing of the mobile phone. The memory 720 may mainly include a program storage area and a data storage area. The program storage area may store an operating system, an application program required by at least one function (for example, a sound playback function and an image playback function), or the like. The data storage area may store data (for example, audio data and a telephone book) and the like created according to use of the mobile phone. In addition, the memory 720 may include a high-speed random access memory, and may also include a non-volatile memory, such as at least one magnetic disk storage device, a flash memory, or another volatile solid-state storage device.

The processor 780 is the control center of the mobile phone, and is connected to various parts of the entire mobile phone by using various interfaces and lines. By running or executing the software program and/or the module stored in the memory 720, and invoking data stored in the memory 720, the processor performs various functions and data processing of the mobile phone, thereby performing overall monitoring on the mobile phone. In some embodiments, the processor 780 may include one or more processing units. In some embodiments, the processor 780 may integrate an application processor and a modem. The application processor mainly processes an operating system, a user interface, an application program, and the like. The modem mainly processes wireless communication. It may be understood that, the modem may either not be integrated into the processor 780.

Although not shown in the figure, the mobile phone may further include a camera, a Bluetooth module, and the like. Details are not described herein again.

Steps performed by the terminal device in the foregoing embodiments may be based on the structure of the terminal device shown in FIG. 22.

Figure 23:
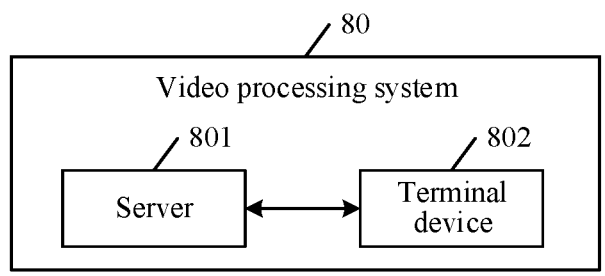
FIG. 23 is a schematic structural diagram of a video processing system according to an embodiment of this application.

This application provides a video processing system. Referring to FIG. 23, FIG. 23 is a schematic structural diagram of a video processing system according to an embodiment of this application. As shown in the figure, a server 801 obtains an original video sequence, the original video sequence including P video frames obtained through rendering, P being an integer greater than or equal to 2. The server 801 obtains a first target video sequence according to the original video sequence, the first target video sequence including the P video frames obtained through rendering and Q unrendered video frames interpolating into the P video frames, Q being an integer greater than or equal to 1. The server 801 encodes the first target video sequence to obtain a video encoding sequence. The server 801 transmits the video encoding sequence to a terminal device 802. The terminal device 802 decodes the video encoding sequence to obtain a video sequence that needs to be rendered, the video sequence that needs to be rendered including (P+Q) unrendered video frames. The terminal device 802 obtains a second target video sequence according to the video sequence that needs to be rendered, the second target video sequence including the (P+Q) unrendered video frames and Y unrendered video frames interpolated into the (P+Q) video frames, Y being an integer greater than or equal to 1. The terminal device 802 renders the second target video sequence to obtain a target video.

An embodiment of this application further provides a computer-readable storage medium, storing a computer program, the computer program, when run on a computer, causing the computer to perform the steps performed by the video processing apparatus in the method according to the foregoing embodiments.

An embodiment of this application further provides a computer program product including a program, the program, when run on a computer, causing the computer to perform the steps performed by the video processing apparatus in the method according to the foregoing embodiments.

A person skilled in the art can clearly understand that for convenience and conciseness of description, for specific working processes of the foregoing described system, apparatus and unit, refer to the corresponding processes in the foregoing method embodiments, and details are not described herein again.

What is claimed is:

1. A video processing method, performed by a server, comprising:
running a plurality of game processes on the server, wherein each game process belongs to one of a first game type and a second game type, and is configured to generate game pictures to be encoded and transmitted to a game terminal of a player;
in a first game processes of the game processes run on the server:
obtaining an original video sequence of the game pictures, the original video sequence comprising P video frames obtained through rendering, P being an integer greater than or equal to 2;
obtaining a target video sequence according to the original video sequence, the target video sequence comprising the P video frames and Q unrendered video frames interpolated based on at least two video frames of the P video frames, Q being an integer greater than or equal to 1;
encoding the target video sequence to obtain a video encoding sequence; and
transmitting the video encoding sequence to a terminal device, the terminal device decoding the video encoding sequence to obtain a video sequence that needs to be rendered, wherein obtaining the target video sequence according to the original video sequence comprises:
obtaining a first rendered video frame and a second rendered video frame from the original video sequence, the first rendered video frame being an image of a previous frame adjacent to the second rendered video frame;
in response to the first game process belonging to the first game type: performing frame interpolation on the first rendered video frame and the second rendered video frame to obtain a target video frame, the target video frame being unrendered and being a next frame adjacent to the first rendered video frame and also a previous frame adjacent to the second rendered video frame; and generating a first video subsequence in the target video sequence that comprises the first rendered video frame, the target video frame, and the second rendered video frame in order; and
in response to the first game process belonging to the second game type: performing frame extrapolation on the first rendered video frame and the second rendered video frame to obtain the target video frame, the target video frame being unrendered and being a next frame adjacent to the second rendered video frame; and generating a second video subsequence in the target video sequence that comprises the first rendered video frame, the second rendered video frame, and the target video frame in order.

2. The method according to claim 1, wherein in response to the first game process belonging to the first game type: the performing frame interpolation on the first rendered video frame and the second rendered video frame to obtain a target video frame comprises:
obtaining a first frame number corresponding to the first rendered video frame;
obtaining a second frame number corresponding to the second rendered video frame;
obtaining a target frame number according to the first frame number and the second frame number; and
obtaining K pieces of pixel information corresponding to the target video frame based on the target frame number and by using a frame interpolation prediction model, the K pieces of pixel information being used for determining the target video frame, K being an integer greater than 1.

3. The method according to claim 1, wherein the obtaining a target video sequence according to the original video sequence comprises:
obtaining a first rendered video frame and a second rendered video frame from the original video sequence, the first rendered video frame being an image of a previous frame adjacent to the second rendered video frame;
performing frame interpolation on the first rendered video frame and the second rendered video frame to obtain a target video frame, the target video frame being an image of a next frame adjacent to the second rendered video frame, and the target video frame being an unrendered video frame; and
generating a second video subsequence in the target video sequence according to the first rendered video frame, the target video frame, and the second rendered video frame, the second video subsequence comprising the first rendered video frame, the second rendered video frame, and the target video frame in order.

4. The method according to claim 1, wherein in response to the first game process belonging to the first game type: the performing frame interpolation on the first rendered video frame and the second rendered video frame to obtain a target video frame comprises:
- obtaining a second frame number corresponding to the second rendered video frame;
- determining a next adjacent frame number of the second frame number as a third frame number;
- obtaining a target frame number according to the second frame number and the third frame number; and
- obtaining K pieces of pixel information corresponding to the target video frame based on the target frame number and by using a frame interpolation prediction model, the K pieces of pixel information being used for determining the target video frame, K being an integer greater than 1.

5. The method according to claim 1, wherein the first game type includes a non-real-time game, and the second game type includes a real-time game.

6. A video processing method, performed by a terminal device, comprising:
- receiving a video encoding sequence of first game pictures transmitted by a server corresponding to a first game process, wherein the first game process is one of a plurality of game processes run on the server, and each game process belongs to one of a first game type and a second game type;
- decoding the video encoding sequence to obtain a video sequence that needs to be rendered, the video sequence that needs to be rendered comprising X unrendered video frames, X being an integer greater than or equal to 2;
- obtaining a target video sequence according to the video sequence that needs to be rendered, the target video sequence comprising the X unrendered video frames and Y unrendered video frames interpolated based on at least two video frames of the X video frames, Y being an integer greater than or equal to 1; and
- rendering the target video sequence to obtain a target video, wherein obtaining the target video sequence according to the video sequence that needs to be rendered comprises:
- obtaining a first unrendered video frame and a second unrendered video frame from the video sequence that needs to be rendered, the first unrendered video frame being an image of a previous frame image adjacent to the second unrendered video frame;
- in response to the first game process belonging to the first game type: performing frame interpolation on the first unrendered video frame and the second unrendered video frame to obtain a target video frame, the target video frame being an image of a next frame adjacent to the first unrendered video frame, the target video frame being unrendered and being a next frame adjacent to the first rendered video frame and also a previous frame adjacent to the second rendered video frame; and generating a first video subsequence in the target video sequence that comprises the first rendered video frame, the target video frame, and the second rendered video frame in order; and
- in response to the first game process belonging to the second game type: performing frame extrapolation on the first rendered video frame and the second rendered video frame to obtain the target video frame, the target video frame being unrendered and being a next frame adjacent to the second rendered video frame; and generating a second video subsequence in the target video sequence that comprises the first rendered video frame, the second rendered video frame, and the target video frame in order.

7. The method according to claim 6, wherein in response to the first game process belonging to the first game type: the performing frame interpolation on the first unrendered video frame and the second unrendered video frame to obtain a target video frame comprises:
- obtaining a first frame number corresponding to the first unrendered video frame;
- obtaining a second frame number corresponding to the second unrendered video frame;
- obtaining a target frame number according to the first frame number and the second frame number; and
- obtaining K pieces of pixel information corresponding to the target video frame based on the target frame number and by using a frame interpolation prediction model, the K pieces of pixel information being used for determining the target video frame, K being an integer greater than 1.

8. The method according to claim 6, wherein the obtaining a target video sequence according to the video sequence that needs to be rendered comprises:
- obtaining a first unrendered video frame and a second unrendered video frame from the video sequence that needs to be rendered, the first unrendered video frame being an image of a previous frame image adjacent to the second unrendered video frame;
- performing frame interpolation on the first unrendered video frame and the second unrendered video frame to obtain a target video frame, the target video frame being an image of a next frame adjacent to the second unrendered video frame; and
- generating a second video subsequence in the target video sequence according to the first unrendered video frame, the target video frame, and the second unrendered video frame, the second video subsequence comprising the first unrendered video frame, the second unrendered video frame, and the target video frame in order.

9. The method according to claim 6, wherein in response to the first game process belonging to the second game type: the performing frame interpolation on the first unrendered video frame and the second unrendered video frame to obtain a target video frame comprises:
- obtaining a second frame number corresponding to the second unrendered video frame;
- determining a next adjacent frame number of the second frame number as a third frame number;
- obtaining a target frame number according to the second frame number and the third frame number; and
- obtaining K pieces of pixel information corresponding to the target video frame based on the target frame number and by using a frame interpolation prediction model, the K pieces of pixel information being used for determining the target video frame, K being an integer greater than 1.

10. A video processing apparatus, comprising: a memory and a processor coupled to the memory, the processor being configured to perform:
- running a plurality of game processes on the server, wherein each game process belongs to one of a first game type and a second game type, and is configured to generate game pictures to be encoded and transmitted to a game terminal of a player;
- in a first game processes of the game processes run on the server:

obtaining an original video sequence of the game pictures, the original video sequence comprising P video frames obtained through rendering, P being an integer greater than or equal to 2;

obtaining a target video sequence according to the original video sequence, the target video sequence comprising the P video frames and Q unrendered video frames interpolated based on at least two video frames of the P video frames, Q being an integer greater than or equal to 1;

encoding the target video sequence to obtain a video encoding sequence; and transmitting the video encoding sequence to a terminal device, the terminal device decoding the video encoding sequence to obtain a video sequence that needs to be rendered, wherein obtaining the target video sequence according to the original video sequence comprises:

obtaining a first rendered video frame and a second rendered video frame from the original video sequence, the first rendered video frame being an image of a previous frame adjacent to the second rendered video frame;

in response to the first game process belonging to the first game type: performing frame interpolation on the first rendered video frame and the second rendered video frame to obtain a target video frame, the target video frame being unrendered and being a next frame adjacent to the first rendered video frame and also a previous frame adjacent to the second rendered video frame; and generating a first video subsequence in the target video sequence that comprises the first rendered video frame, the target video frame, and the second rendered video frame in order; and in response to the first game process belonging to the second game type: performing frame extrapolation on the first rendered video frame and the second rendered video frame to obtain the target video frame, the target video frame being unrendered and being a next frame adjacent to the second rendered video frame; and generating a second video subsequence in the target video sequence that comprises the first rendered video frame, the second rendered video frame, and the target video frame in order.

11. The apparatus according to claim 10, wherein in response to the first game process belonging to the first game type: the performing frame interpolation on the first rendered video frame and the second rendered video frame to obtain a target video frame comprises:

obtaining a first frame number corresponding to the first rendered video frame;

obtaining a second frame number corresponding to the second rendered video frame;

obtaining a target frame number according to the first frame number and the second frame number; and obtaining K pieces of pixel information corresponding to the target video frame based on the target frame number and by using a frame interpolation prediction model, the K pieces of pixel information being used for determining the target video frame, K being an integer greater than 1.

12. The apparatus according to claim 10, wherein the obtaining a target video sequence according to the original video sequence comprises:

obtaining a first rendered video frame and a second rendered video frame from the original video sequence, the first rendered video frame being an image of a previous frame adjacent to the second rendered video frame;

performing frame interpolation on the first rendered video frame and the second rendered video frame to obtain a target video frame, the target video frame being an image of a next frame adjacent to the second rendered video frame, and the target video frame being an unrendered video frame; and generating a second video subsequence in the target video sequence according to the first rendered video frame, the target video frame, and the second rendered video frame, the second video subsequence comprising the first rendered video frame, the second rendered video frame, and the target video frame in order.

13. The apparatus according to claim 10, wherein in response to the first game process belonging to the second game type: the performing frame interpolation on the first rendered video frame and the second rendered video frame to obtain a target video frame comprises:

obtaining a second frame number corresponding to the second rendered video frame;

determining a next adjacent frame number of the second frame number as a third frame number;

obtaining a target frame number according to the second frame number and the third frame number; and obtaining K pieces of pixel information corresponding to the target video frame based on the target frame number and by using a frame interpolation prediction model, the K pieces of pixel information being used for determining the target video frame, K being an integer greater than 1.

14. A video processing apparatus, comprising: a memory and a processor coupled to the memory, the processor being configured to perform:

receiving a video encoding sequence of first game pictures transmitted by a server corresponding to a first game process, wherein the first game process is one of a plurality of game processes run on the server, and each game process belongs to one of a first game type and a second game type;

decoding the video encoding sequence to obtain a video sequence that needs to be rendered, the video sequence that needs to be rendered comprising X unrendered video frames, X being an integer greater than or equal to 2;

obtaining a target video sequence according to the video sequence that needs to be rendered, the target video sequence comprising the X unrendered video frames and Y unrendered video frames interpolated based on at least two video frames of the X video frames, Y being an integer greater than or equal to 1; and rendering the target video sequence to obtain a target video, wherein obtaining the target video sequence according to the video sequence that needs to be rendered comprises:

obtaining a first unrendered video frame and a second unrendered video frame from the video sequence that needs to be rendered, the first unrendered video frame being an image of a previous frame image adjacent to the second unrendered video frame;

in response to the first game process belonging to the first game type: performing frame interpolation on the first unrendered video frame and the second unrendered video frame to obtain a target video frame, the target video frame being an image of a next frame adjacent to the first unrendered video frame, the target video frame being unrendered and being a next frame adjacent to the first rendered video frame and also a previous frame adjacent to the second rendered video frame; and generating a first video subsequence in the target video sequence that comprises the first rendered video frame, the target video frame, and the second rendered video frame in order; and in response to the first game process belonging to the second game type: performing frame extrapolation on the first rendered video frame and the second rendered video frame to obtain the target video frame, the target video frame being unrendered and being a next frame adjacent to the second rendered video frame; and generating a second video subsequence in the target video sequence that comprises the first rendered video frame, the second rendered video frame, and the target video frame in order.

15. The apparatus according to claim 14, wherein in response to the first game process belonging to the first game type: the performing frame interpolation on the first unrendered video frame and the second unrendered video frame to obtain a target video frame comprises:

obtaining a first frame number corresponding to the first unrendered video frame;

obtaining a second frame number corresponding to the second unrendered video frame;

obtaining a target frame number according to the first frame number and the second frame number; and obtaining K pieces of pixel information corresponding to the target video frame based on the target frame number and by using a frame interpolation prediction model, the K pieces of pixel information being used for determining the target video frame, K being an integer greater than 1.

16. The apparatus according to claim 14, wherein the obtaining a target video sequence according to the video sequence that needs to be rendered comprises:

obtaining a first unrendered video frame and a second unrendered video frame from the video sequence that needs to be rendered, the first unrendered video frame being an image of a previous frame image adjacent to the second unrendered video frame;

performing frame interpolation on the first unrendered video frame and the second unrendered video frame to obtain a target video frame, the target video frame being an image of a next frame adjacent to the second unrendered video frame; and generating a second video subsequence in the target video sequence according to the first unrendered video frame, the target video frame, and the second unrendered video frame, the second video subsequence comprising the first unrendered video frame, the second unrendered video frame, and the target video frame in order.

17. The apparatus according to claim 14, wherein in response to the first game process belonging to the second game type: the performing frame interpolation on the first unrendered video frame and the second unrendered video frame to obtain a target video frame comprises:

obtaining a second frame number corresponding to the second unrendered video frame;

determining a next adjacent frame number of the second frame number as a third frame number;

obtaining a target frame number according to the second frame number and the third frame number; and obtaining K pieces of pixel information corresponding to the target video frame based on the target frame number and by using a frame interpolation prediction model, the K pieces of pixel information being used for determining the target video frame, K being an integer greater than 1.

* * * * *